United States Patent
Tran et al.

(10) Patent No.: US 10,027,676 B2
(45) Date of Patent: Jul. 17, 2018

(54) METHOD AND SYSTEM FOR MULTI-USER, MULTI-DEVICE LOGIN AND CONTENT ACCESS CONTROL AND METERING AND BLOCKING

(75) Inventors: Dang Tran, Laguna Niguel, CA (US);
Fabio Gava, Ladera Ranch, CA (US);
Yingnan Zhu, Irvine, CA (US);
Andrew Shelansky, Irvine, CA (US);
Michael Lovelace, Irvine, CA (US);
Esther Zheng, Irvine, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 459 days.

(21) Appl. No.: 13/083,429

(22) Filed: Apr. 8, 2011

(65) Prior Publication Data
US 2011/0185437 A1    Jul. 28, 2011

Related U.S. Application Data

(63) Continuation-in-part of application No. 12/885,214, filed on Sep. 17, 2010, now Pat. No. 9,106,424.

(60) Provisional application No. 61/292,144, filed on Jan. 4, 2010.

(51) Int. Cl.
*G06Q 20/00* (2012.01)
*H04L 29/06* (2006.01)
*H04N 21/41* (2011.01)
*H04N 21/475* (2011.01)

(52) U.S. Cl.
CPC ....... *H04L 63/104* (2013.01); *H04N 21/4126* (2013.01); *H04N 21/4751* (2013.01)

(58) Field of Classification Search
USPC ......................................................... 705/59
See application file for complete search history.

(56) References Cited

U.S. PATENT DOCUMENTS

| | | | |
|---|---|---|---|
| 4,672,572 A * | 6/1987 | Alsberg | 726/11 |
| 5,933,498 A * | 8/1999 | Schneck et al. | 705/54 |
| 5,973,683 A | 8/1999 | Cragun et al. | |
| 6,170,014 B1 * | 1/2001 | Darago et al. | 709/229 |

(Continued)

FOREIGN PATENT DOCUMENTS

| | | |
|---|---|---|
| EP | 1489800 A1 | 12/2004 |
| KR | 20040111191 A | 12/2004 |

OTHER PUBLICATIONS

U.S. Non-Final Office Action for U.S. Appl. No. 12/885,214 dated May 12, 2014.

(Continued)

*Primary Examiner* — John Hayes
*Assistant Examiner* — John M Winter
(74) *Attorney, Agent, or Firm* — Sherman IP LLP; Kenneth L. Sherman; Steven Laut

(57) ABSTRACT

A method and system for multi-user, multi-device content access metering and control is provided. In one embodiment, a system implements a method such that in response to user login requests, the system controls login access by providing multiple users login access to plural electronic devices capable of communicating via a communication system. Further, in response to user content access actions, the system controls access to content by selectively providing content to said one or more users via said one or more electronic devices based on content access policies.

41 Claims, 15 Drawing Sheets

(56) References Cited

U.S. PATENT DOCUMENTS

| | | | |
|---|---|---|---|
| 6,813,775 | B1 | 11/2004 | Finseth et al. |
| 7,043,530 | B2 | 5/2006 | Isaacs et al. |
| 7,131,132 | B1 | 10/2006 | Gehlot et al. |
| 7,640,341 | B2 | 12/2009 | Regan |
| 7,711,775 | B2 | 5/2010 | Tavis et al. |
| 7,895,076 | B2 | 2/2011 | Kutaragi et al. |
| 8,079,042 | B2 | 12/2011 | Foti et al. |
| 8,185,949 | B2 | 5/2012 | Jonsson |
| 8,356,337 | B2 | 1/2013 | Scott et al. |
| 8,443,068 | B2 | 5/2013 | Lee et al. |
| 8,566,874 | B2 | 10/2013 | Roberts et al. |
| 8,639,214 | B1 | 1/2014 | Fujisaki |
| 2002/0023132 | A1 | 2/2002 | Tornabene et al. |
| 2002/0034281 | A1 | 3/2002 | Issacs E et al. |
| 2002/0087625 | A1 | 7/2002 | Toll et al. |
| 2003/0151621 | A1 | 8/2003 | McEvilly et al. |
| 2004/0255321 | A1* | 12/2004 | Matz ................................ 725/14 |
| 2005/0160458 | A1 | 7/2005 | Baumgartner |
| 2006/0031381 | A1* | 2/2006 | Van Luijt et al. ............ 709/217 |
| 2006/0143717 | A1 | 6/2006 | Ransome et al. |
| 2006/0149955 | A1 | 7/2006 | Velhal et al. |
| 2006/0256734 | A1 | 11/2006 | Erhart et al. |
| 2007/0043720 | A1 | 2/2007 | Koenig |
| 2007/0183746 | A1 | 8/2007 | Haeuser et al. |
| 2007/0256019 | A1 | 11/2007 | Hirsave et al. |
| 2008/0114737 | A1 | 5/2008 | Neely et al. |
| 2008/0126529 | A1* | 5/2008 | Kim ........................ H04W 4/02 709/223 |
| 2008/0178001 | A1* | 7/2008 | Kim et al. .................... 713/167 |
| 2008/0249987 | A1 | 10/2008 | Ogasawara |
| 2008/0275974 | A1 | 11/2008 | Rackiewicz |
| 2008/0288996 | A1 | 11/2008 | Walter et al. |
| 2008/0311889 | A1 | 12/2008 | Dunko et al. |
| 2009/0138805 | A1 | 5/2009 | Hildreth |
| 2009/0234876 | A1 | 9/2009 | Schigel et al. |
| 2009/0248602 | A1 | 10/2009 | Frazier |
| 2009/0254656 | A1* | 10/2009 | Vignisson ......... G06F 17/30867 709/224 |
| 2009/0300671 | A1 | 12/2009 | Scott et al. |
| 2010/0211884 | A1 | 8/2010 | Kashyap et al. |
| 2010/0212001 | A1 | 8/2010 | Kashyap et al. |
| 2010/0333137 | A1* | 12/2010 | Hamano ................ H04H 60/46 725/39 |
| 2011/0125906 | A1 | 5/2011 | Chunilal |
| 2011/0161085 | A1 | 6/2011 | Boda et al. |
| 2011/0167355 | A1 | 7/2011 | Shelansky |
| 2011/0225293 | A1 | 9/2011 | Rathod |
| 2011/0311206 | A1 | 12/2011 | Hubner et al. |
| 2013/0019186 | A1 | 1/2013 | Lance et al. |

OTHER PUBLICATIONS

Nielsenmedia.com, "Our Measurement Techniques | Nielsen Media Research", webpage printed Apr. 14, 2009, pp. 1-2, The Nielsen Company, USA.

Nielsenmedia.com, "Installing and Monitoring Meters | Nielsen Media Research", webpage printed Apr. 14, 2009, p. 1, The Nielsen Company, USA.

Nielsenmedia.com, "Metering Television in the Digital Agel Nielsen Media Research", webpage printed Apr. 14, 2009, p. 1, The Nielsen Company, USA.

Nielsenmedia.com, "New Challenges & Ideas | Nielsen Media Research", webpage printed Apr. 14, 2009, p. 1, The Nielsen Company, USA.

U.S. Non-Final Office Action for U.S. Appl. No. 12/371,365 dated Jun. 6, 2012.

U.S. Final Office Action for U.S. Appl. No. 12/371,365 dated Sep. 21, 2012.

U.S. Non-Final Office Action for U.S. Appl. No. 12/371,365 dated Nov. 23, 2012.

U.S. Final Office Action for U.S. Appl. No. 12/371,365 dated May 8, 2013.

U.S. Notice of Allowance for U.S. Appl. No. 12/371,365 dated Jul. 25, 2013.

U.S. Non-Final Office Action for U.S. Appl. No. 12/371,444 dated Apr. 21, 2011.

U.S. Final Office Action for U.S. Appl. No. 12/371,444 dated Aug. 16, 2011.

U.S. Advisory Action for U.S. Appl. No. 12/371,444 dated Oct. 20, 2011.

U.S. Non-Final Office Action for U.S. Appl. No. 12/371,444 dated Nov. 29, 2011.

U.S. Final Office Action for U.S. Appl. No. 12/371,444 dated Mar. 28, 2012.

U.S. Advisory Action for U.S. Appl. No. 12/371,444 dated Jul. 11, 2012.

U.S. Advisory Action for U.S. Appl. No. 12/371,444 dated Aug. 14, 2012.

U.S. Non-Final Office Action for U.S. Appl. No. 12/885,214 dated Jul. 9, 2012.

U.S. Final Office Action for U.S. Appl. No. 12/885,214 dated Jan. 2, 2013.

U.S. Advisory Action for U.S. Appl. No. 12/885,214 dated Mar. 13, 2013.

European Search Report dated Nov. 19, 2014 for European Application No. 11181460.4 from European Patent Office, pp. 1-7, Munich, Germany.

European Office Action dated Feb. 5, 2016 for European Application No. 11181460.4 from European Patent Office, pp. 1-6, Rijswijk, Netherlands.

Korean Office Action dated Jul. 10, 2017 for Korean Patent Application No. 2011-0089647 from Korean Patent Office, pp. 1-16, Seoul, South Korea (Engiish-language translation included pp. 1-8).

U.S. Final Office Action for U.S. Appl. No. 12/371,444 dated May 29, 2014.

U.S. Advisory Action for U.S. Appl. No. 12/885,214 dated Mar. 3, 2015.

U.S. Final Office Action for U.S. Appl. No. 12/885,214 dated Dec. 4, 2014.

U.S. Notice of Allowance for U.S. Appl. No. 12/885,214 dated Mar. 30, 2015.

Korean Notice of Allowance dated Nov. 20, 2017 for Korean Patent Application No. 2017-080561510 from Korean Patent Office, pp. 1-5, Seoul, South Korea (English-language translation included pp. 1-5).

* cited by examiner

US 10,027,676 B2

METHOD AND SYSTEM FOR MULTI-USER, MULTI-DEVICE LOGIN AND CONTENT ACCESS CONTROL AND METERING AND BLOCKING

RELATED APPLICATION

This application is a continuation-in-part, and claims priority to, U.S. patent application Ser. No. 12/885,214, filed on Sep. 17, 2010, which in turn claims priority from U.S. Provisional Patent Application Ser. No. 61/292,144, filed on Jan. 4, 2010, both incorporated herein by reference.

FIELD OF THE INVENTION

The present invention relates in general to multi-user systems, and in particular to control access to content in multi-user systems.

BACKGROUND OF THE INVENTION

Conventional multi-user electronic systems involve the use of individual "user accounts", "user profiles", or "logins" (collectively, "logins") for access to electronic devices such as consumer electronics (CE) devices, computing devices, etc. In many of such devices, only a single user can be logged into a device and active at any one time. Multiple users are not effectively able to share or control any single device between them.

For parental control applications, a prevalent parental-control technology for television viewing is the "V-Chip" device. Such a device provides blocking of inappropriate content based on rating information included within a broadcast stream and based upon a parental selection of appropriateness, which is generally guarded by a PIN or password. Such parental control systems are inherently single-user, and do not provide user presence management.

BRIEF SUMMARY OF THE INVENTION

Embodiments of the invention provide a method and system for multi-user, multi-device login and content access control and metering. In one embodiment, the invention provides a system that in response to user login requests, controls login access by providing multiple users login access to plural electronic devices capable of communicating via a communication system. Further, in response to user content access actions, the system controls access to content by selectively providing content to said one or more users via said one or more electronic devices based on content access policies.

These and other features, aspects and advantages of the present invention will become understood with reference to the following description, appended claims and accompanying figures.

DESCRIPTION OF THE INVENTION

Figure 1:
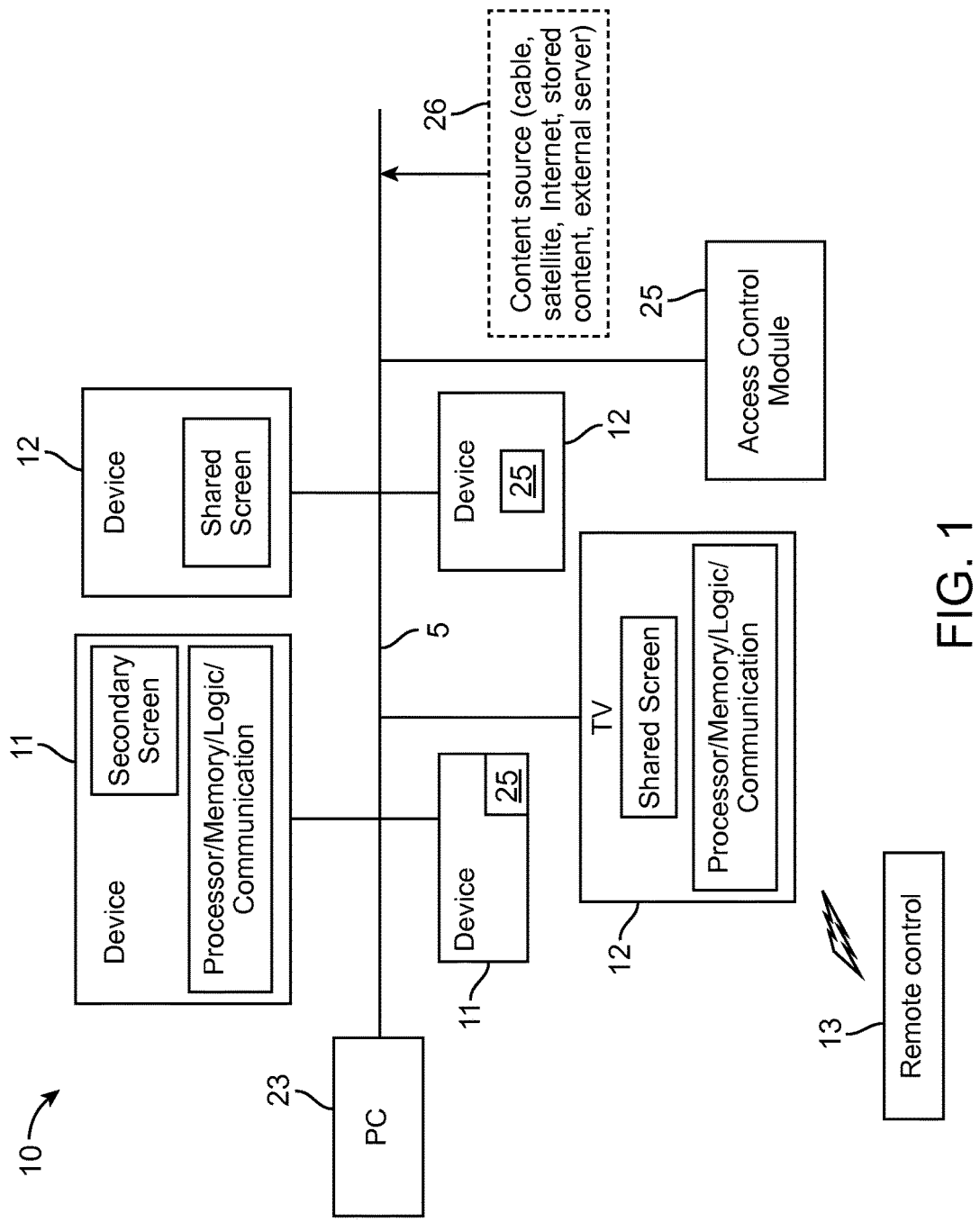
FIG. 1 shows a diagram of a communication system comprising a network for multi-user, multi-device login and content access control, according to an embodiment of the invention.

Embodiments of the invention provide a method and system for multi-user, multi-device content access metering and control. In one embodiment, the invention provides a system that in response to user login requests, controls login access by providing multiple users login access to plural electronic devices capable of communicating via a communication system. Further, in response to user content access actions, the system controls access to content by selectively providing content to said one or more users via said one or more electronic devices based on content access policies.

In one embodiment, the invention provides an access control system for both controlling access to inappropriate content, and metering of access to content, for one or more simultaneous users across a network of one or more connected devices, such as in a local area network. In one embodiment, the access control system tracks presence of multiple users across the network. The access control system further applies a configurable (adjustable) set of rules and schemes for metering and controlling (e.g., blocking) access to content on a single device based on a list of users logged onto that device and usage history of each user across all devices within the network.

Embodiments of a multi-user, multi-device access control method and system for multiple electronic devices, according to the invention, are described herein below. In one implementation of the access control system in a network of devices, each device allows multiple users to be logged on (logged in) or logged off (logged out) that device simultaneously (concurrently). In one example, user profile and activity are shared between the devices in a communication network such as a local network of communal devices (e.g., televisions) and personal devices (e.g., handheld electronic devices, tablets, laptop computers, personal computers (PCs)).

The access control system includes a login control module that accepts simultaneous user logins on a group of devices (e.g., personal or communal devices), allowing user presence (e.g., login/logoff status) and information (e.g., identity) on each device to be shared among a plurality of electronic devices in the network.

In one embodiment of the access control system according to the invention, each device may include hardware processor, memory, and logic and communication modules. For example, certain display screen devices (e.g., televisions) are designed to be used or viewed by multiple users at the same time as communal devices. In many cases, there are multiple such devices in a single area (such as a television in each of several different rooms of a networked home). Such devices, along with other devices in the network, include general-purpose processors, communication mechanisms (e.g., one or more of Ethernet, Bluetooth, and Wi-Fi such as IEEE 802.11 WLAN, etc.), and the ability to host applications. Further, such devices store personalization information, preferences, and other information (collectively, "user profile").

An embodiment of the access control system according to the invention allows multiple such devices that operate on a communication mechanism (e.g., wireless and/or wired local area network) to share one or more user profiles and other information. Therefore, multiple user profiles can be established and shared between the networked devices. Multiple users may be concurrently logged on to a device, and users of a device can determine (e.g., using of a heads-up display on that device) the current state and location of other users (such as whether they are logged on to a different device, or logged off entirely).

Further, embodiments of the access control system according to the invention allow users to log on and log off of the devices by various mechanisms, such as by keypresses on a remote control, through personal devices connected to the communication mechanism (e.g., wireless and/or wired local area network). Such personal devices (e.g., mobile phones, mobile electronic devices) may also include display screens, and are termed "second-screen devices" herein. According to embodiments of the invention, the second-screen devices may further function as stores of information, and also as sources of login requests and optionally user credentials.

FIG. 1 shows a multi-user, multi-device network 10 providing access control, according to an embodiment of the invention. The network 10 implements a method for managing access control, logins and user profiles across a number of devices, such that multiple users can use each of multiple "shared-screen" devices 12, with a coherent, persistent login state between the devices 12.

In this embodiment, the network 10 includes one or more devices 12 with large shared display screens designed for viewing by multiple users (e.g., communal devices such as televisions). The large display screen devices 12 comprise general-purpose processors, memory, the ability to host applications and a communication mechanism (e.g., a network connection such as Ethernet, or Wi-Fi, Bluetooth, USB, or any other one-to-one or many-to-many communication mechanism).

Further, the network 10 may include one or more personal second-screen devices 11 through which users log in and out of the various shared-screen devices 12 (among other operations). These second-screen devices 11 share a communication mechanism (such as a wired or wireless network connection 5) that is compatible with the devices 12, as well as having the ability to host applications. Examples of devices 11 include mobile electronic devices such as mobile phone devices, personal digital assistant devices, etc. The network 10 may further include computing devices such as a PC 23.

In one embodiment, the network 10 further includes an access control module (access controller) 25 implementing functions for multi-user, multi-device login, according to the invention. In one embodiment, the access control module 25 may be implemented in a stand alone device. In another embodiment, one or more of the devices 11 and/or devices 12 may each include an access control module 25 therein. In another embodiment, functionality of the access control module 25 may be implemented by the devices 11 and/or devices 12 in combination or separately. As such, implementation of the multi-user, multi-device access control according to the invention is not limited to the example implementation described. In one embodiment, the access control module 25 provides content access blocking, and metering access to content, sourcing from a content source 26, according to an embodiment of the invention.

Figure 2:
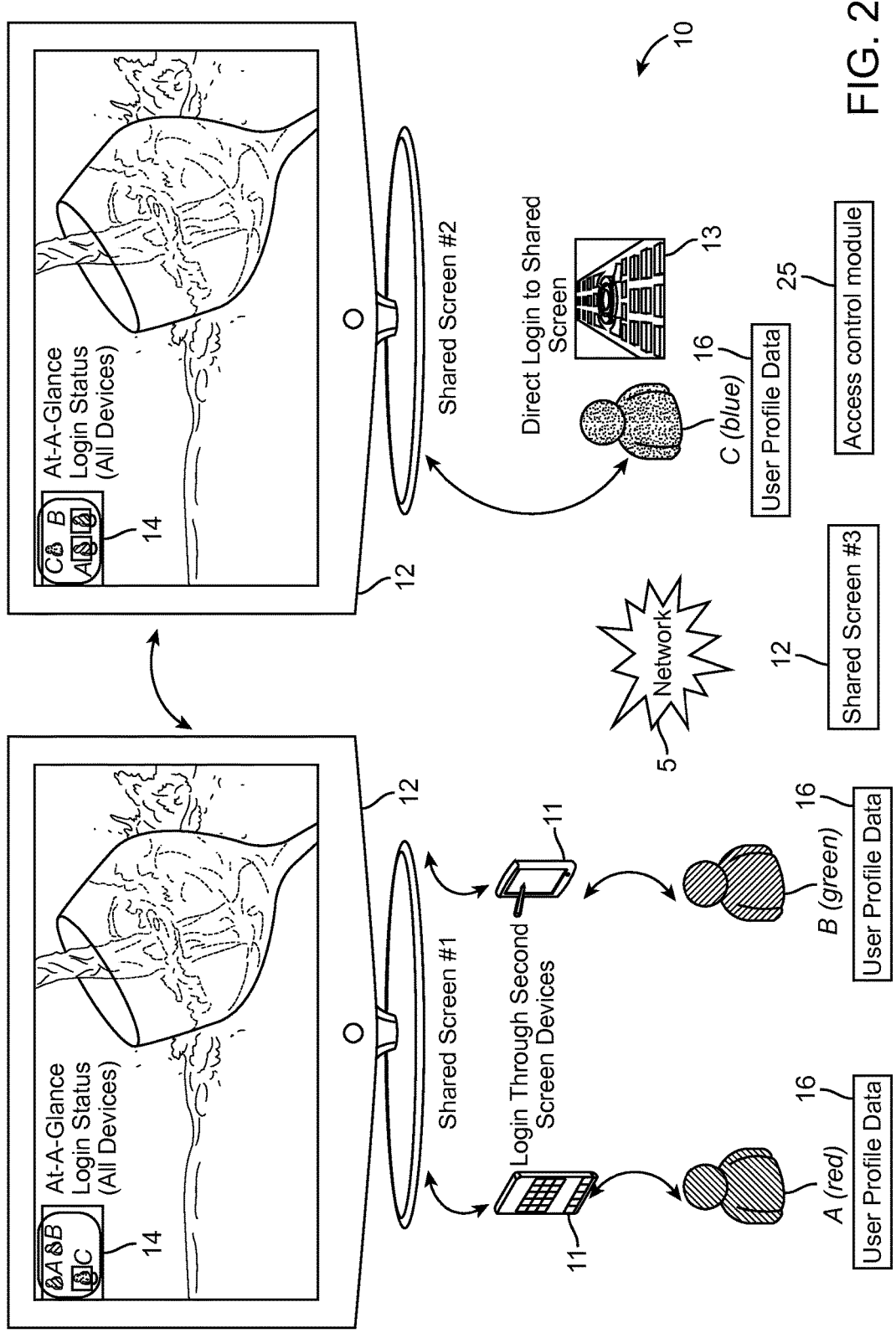
FIG. 2 illustrates an implementation of a network for multi-user, multi-device login and content access control, according to an embodiment of the invention.

FIG. 2 illustrates an implementation of the network 10 including an access control module 25, wherein in one example scenario three users interact with the network 10 using two different shared-screen devices 12 (e.g., televisions Shared-screen #1 device and Shared-screen #2 device), and different login mechanisms. The leftmost user A is utilizing a second-screen device 11 (e.g., mobile electronic device) to interact with the network 10 (e.g., log on to and access content). For example, using the second-screen device 11, the user A has logged on to Shared-screen #1 device 12. User B is utilizing a different second-screen device 11 (e.g., an electronic tablet-style device) to also log on to the network 10. User B also chose to log on to Shared-screen #1 device 12.

A third user C has elected to log on directly to Shared-screen #2 device 12 without using a second-screen device 11, but simply using an intelligent remote control 13 for Shared-screen #2 device 12 to log on to the network 10 (and to the Shared-screen #2 device 12). As such, in this example, there are three users logged on to the network 10. The users A and B are concurrently logged on to Shared-screen #1 device 12, and the user C is logged in to Shared-screen #2 device 12.

Users A and B are able to access information based on user profiles of both users A and B on the Shared-screen #1 device 12, while user C has a more typical experience with Shared-screen #2 device 12 with only a single active profile for user C. In addition, each user can monitor a second-screen device 11 or their shared-screen device 12 (e.g., using graphical user interface 14) to determine which users are logged on to the network 10 as a whole, and which device each user is logged on to. Each user interface 14 shown provides an example presentation of information. According to embodiments of the invention, any suitable heads-up display (or no display at all) can be integrated with the login and profile mechanism.

Figure 3A:
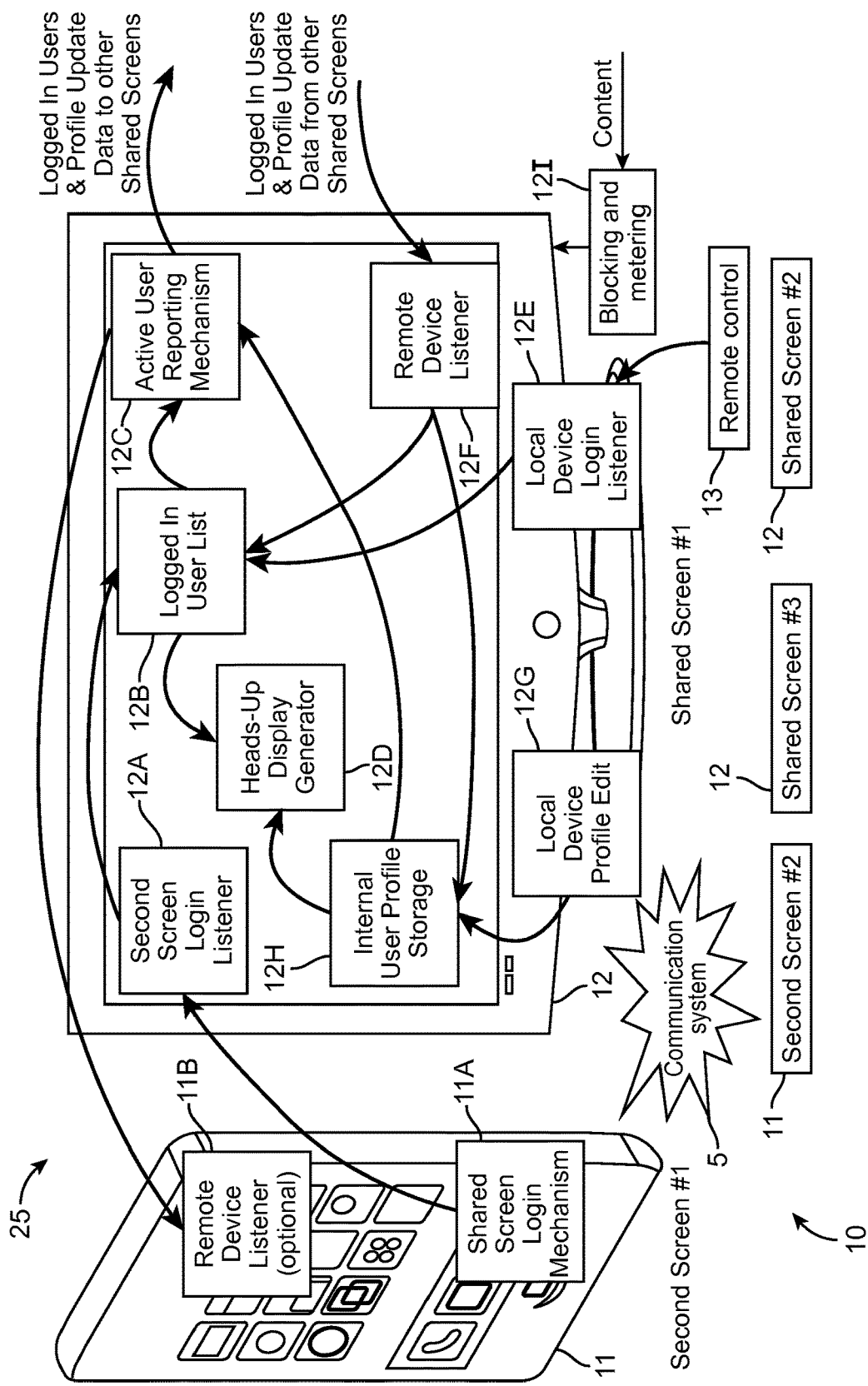
FIG. 3A illustrates a multi-user, multi-device login and content access control system, according to an embodiment of the invention.

FIG. 3A shows a second-screen device 11 (Second-screen #1) and a shared-screen device 12 (Shared-screen #1) in the network 10 according to an embodiment of the invention. FIG. 3A also illustrates an operation process, as well as the communications between the devices 11 and 12 (e.g., using a wired and/or wireless communication system 5), according to an embodiment of the invention. An access control module 25 includes a shared-screen login module 11A, a remote device listener module 11B, a second-screen login listener module 12A, a logged in user list module 12B, an active user reporting module 12C, a heads-up display generator module 12D, a local device login listener module 12E, a remote device listener module 12F, a local device profile edit module 12G, an internal user profile storage 12H, and a content blocking and metering module 12I, as described herein below.

In one embodiment, when a user logs on to the network 10 a login command is sent to the second-screen login listener module 12A in Shared-screen #1 device 12. The login listener module 12A receives the command and updates the logged in users list module 12B. This information is shared among the devices in the network, such as using the active user reporting module 12C, and also rendered to the display screens of the involved devices using a display generator module 12D.

When a user logs on directly to the Shared-screen #1 device 12, such as through a wireless (Infrared) remote control 13 (FIG. 1), the local device login listener module 12E receives the login command, and updates the logged-in users list module 12B. As before, the active user reporting mechanism module 12C propagates this information to other devices (second-screen devices 11 and shared-screen devices 12). In one embodiment, the network 10 implements an access process that provides a single consensus view of which users are accessing which devices in the network 10. In one embodiment, this may be based on the order in which user commands are received, and based on the devices in the network 10 to which the commands are sent.

The remote device listener module 12F listens for updates from the active user reporting module 12C on other shared-screen devices. In one embodiment, the modules 12C and 12F keep a consistent state between all shared-screen devices in the network 10. All changes made on one device are replicated to other devices. The active user reporting module 12C is also utilized to send similar updates to second-screen devices 11. The local device profile edit module 12G processes changes (made through a second-screen or remote control input) to a user profile data 16 (FIG. 2). The module 12G accepts the edits, processes them, and updates other modules such as the internal user profile storage 12H.

According to an embodiment of the invention, each user may be logged into one shared-screen device 12 and one second-screen device 11 at any given time in the network 10. For example, if a user is logged on to Shared-screen #1 device 12 via a Second-screen #1 device 11, and then that user sends a login command to Shared-screen #2 device 12 from the same Second-screen #1 device 11, the user is logged out of Shared-screen #1 device 12 and logged into Shared-screen #2 device 12. If the user then utilizes a new second-screen device 11 (such as Second-screen #2 device), to log into Shared-screen #3 device 12, the user is logged out of the Second-screen #1 device 11, and also logged out of the Shared-screen #2 device 12, and logged into the new Second-screen #2 device 11 and the Shared-screen #3 device 12.

In one embodiment of the invention, each user of the multi-user, multi-device network 10 can have a full set of user-specific profile data 16 (FIG. 2) associated therewith. In one example, user-specific profile data 16 for the users is maintained in a memory device 12H in one or more shared-screen devices 12. In one implementation, the user profile data 16 for a user may include user statistics such as real name, age, and gender, but can also include additional information such as content access rules and sharing scheme (sharing formula), parental controls, personal preferences for the operation of the shared-screen devices 12, preferences and other miscellaneous profile data associated with individual applications that are hosted on some or all of the shared-screen devices 12, etc.

When multiple users are active and logged on to the same shared-screen device 12, one or more users can interact with the information in user profile data 16 of each logged in user. In one embodiment, each user profile data 16 further includes "shared" profile information, which shared-screen devices 12 can generally access and display whenever a user is logged in. In one embodiment, each user profile data 16 further includes "private" profile information that can only be shared with the shared-screen device 12 a user is logged into, or displayed to users on any shared-screen device 12 by the explicit command of the user to whom the data is private. In one embodiment, "Private" information is part of the profile data that is only available on a second-screen device unless explicit permission to share the information is given. This permission can, in certain embodiments, apply to only a single shared-screen device or apply to all shared-screen devices optionally based upon the type of permission granted by the user. According to an embodiment of the invention, typically a second-screen device 11 is used to log on to the network 10. A two-tiered privacy mechanism provided to allow the free sharing of innocuous data, as well as the controlled sharing of information that may be private or personal in nature to a user.

In one embodiment, a remote control device is used to send key codes to a shared screen device, such as for browsing a TV menu and providing user log in credentials.

Figure 3B:
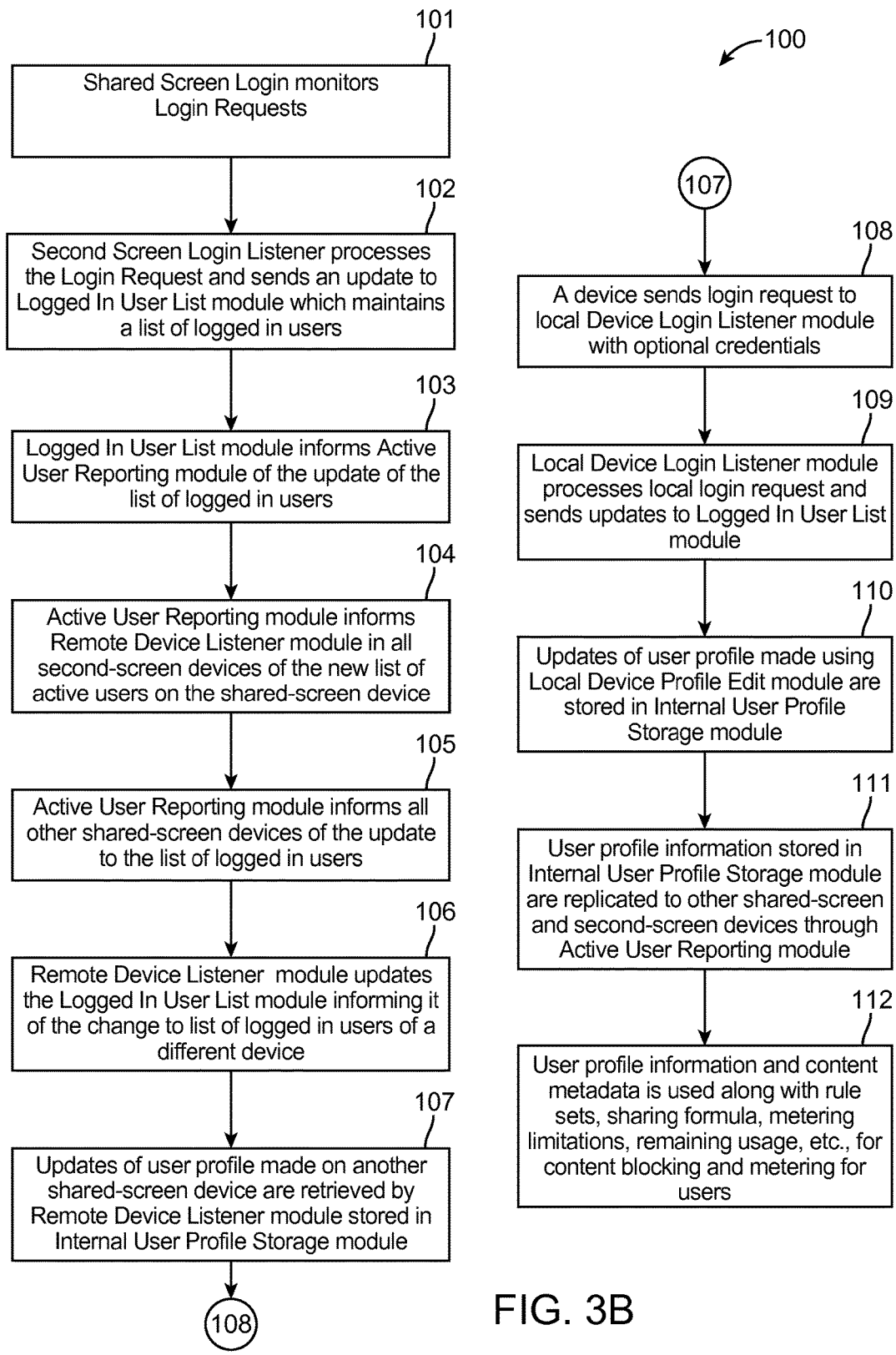
FIG. 3B illustrates a flowchart of an embodiment of a multi-user, multi-device login and content access process implemented by the control system of FIG. 3A, according to an embodiment of the invention.

FIG. 3B illustrates a login process 100 implemented by the network of FIG. 3A, according to an embodiment of the invention. The login process 100 includes the following process blocks:

Block 101: Login listener module 12A monitors login requests using a device in the network.

Block 102: The second-screen login listener module 12A processes the login request and sends an update to the logged in user list module 12B which maintains a list of logged in users.

Block 103: The logged in user list module 12B informs the active user reporting module 12C of the update of the list of logged in users.

Block 104: The active user reporting module 12C informs the remote device listener module 11B in all second-screen devices of the new list of active users on the shared-screen device 12.

Block 105: The active user reporting module 12C informs all other shared-screen devices of the update to the list of logged in users. This information is received by the remote device listener module 12F of other second-screen devices.

Block 106: The remote device listener module 12F updates the logged in user list module 12B informing it of the change to the list of logged in users on a different device.

Block 107: Updates of user profile made on another shared-screen device are retrieved by the remote device listener module 12F and stored in the internal user profile storage module 12H.

Block 108: A device in the network is used to send a login request to the local device login listener module 12E with optional credentials.

Block 109: The local device login listener module 12E processes the local login request and sends updates to the logged in user list module 12B.

Block 110: Updates of user profile made using the local device profile edit module 12G are stored in the internal user profile storage module 12H.

Block 111: The user profile information stored by the internal user profile storage module 12H are replicated to other shared-screen and second-screen devices through the active user reporting module 12C.

Block 112: User profile information and content metadata is used along with rule sets, sharing schemes, metering limitations, remaining usage, etc., for content blocking and metering for users by content blocking and metering module 12I.

The communications between the electronic devices in the examples illustrated in FIGS. 3A-3B are via the communication system 5. In one embodiment of the communication system 5, all the electronic devices may be on a single local area network, and in one example certain devices may use e.g., Ethernet and others use e.g., Wi-Fi, for communication. In another embodiment of the communication system 5, the electronic devices may be part of a mesh network where the only requirement is that each device is connected to the other devices using a communication mechanism.

According to an embodiment of the invention, the devices in the network 10 may include at least one display-connected device (e.g., TV) and other devices such as Set-Top Box, Game Console, Blu-Ray or DVD Player or other device with either an integrated display or a connection to a display device, connected together via the communication system 5. For example, there may be an Ethernet Network between a first set of devices D1, D2, and D3. There may also be a separate Ethernet network with devices D4, D5, and D6. They may also be a one-to-one Bluetooth connection between D2 and D4. A login system according to an embodiment of the invention operates on all devices D1-D6 (not shown) making extra "hops" across the Bluetooth as needed.

FIGS. 5A-5B illustrate example use-cases according to embodiments of the invention wherein multiple users of a shared-screen device 12 such as a digital television (DTV) access the network 10 using one or more personal second-screen devices 11. Specifically, FIG. 5A illustrates user A previously logged into shared-screen LR device 12 and user B previously logged into shared-screen BR device 12. Then user C logs into shared-screen BR device 12 using a personal second-screen device 11. As a result, both shared-screen LR device 12 and shared-screen BR device 12 display the login status of the users A and C as logged into shared-screen LR device 12 and shared-screen BR device 12, respectively. Further, both shared-screen LR device 12 and shared-screen BR device 12 show user C as new user logged into shared-screen BR device 12.

FIG. 5B illustrates that at a later time user A utilizes a personal second-screen device 11 to log into the shared-screen LR device 12 (causing automatic log out and then logging into the shared-screen LR device 12). Further, user C utilizes a personal second-screen device 11 to log into the shared-screen LR device 12 (causing automatic log out from shared-screen BR device 12). User B remains logged into shared-screen BR device 12. As a result, both shared-screen LR device 12 and shared-screen BR device 12 display the login status of the users A and C as new users logged into shared-screen LR device 12, while login status display of user B remains unchanged.

In one embodiment, a user may log on using a personal second-screen device 11. A device 11 is used to send login request(s), and optionally required credentials to, the second-screen login listener module 12A. The module 12A processes the response and updates the logged in user list module 12B. The update is propagated, causing the local screen (Shared-Screen #2 in FIGS. 4-5) to update through the heads-up display generator 12D, sending messages to one or more other shared-screens devices through the communication mechanism using the module 12C, other devices, modules 12F, 12B and 12D, as described herein.

Figure 4:
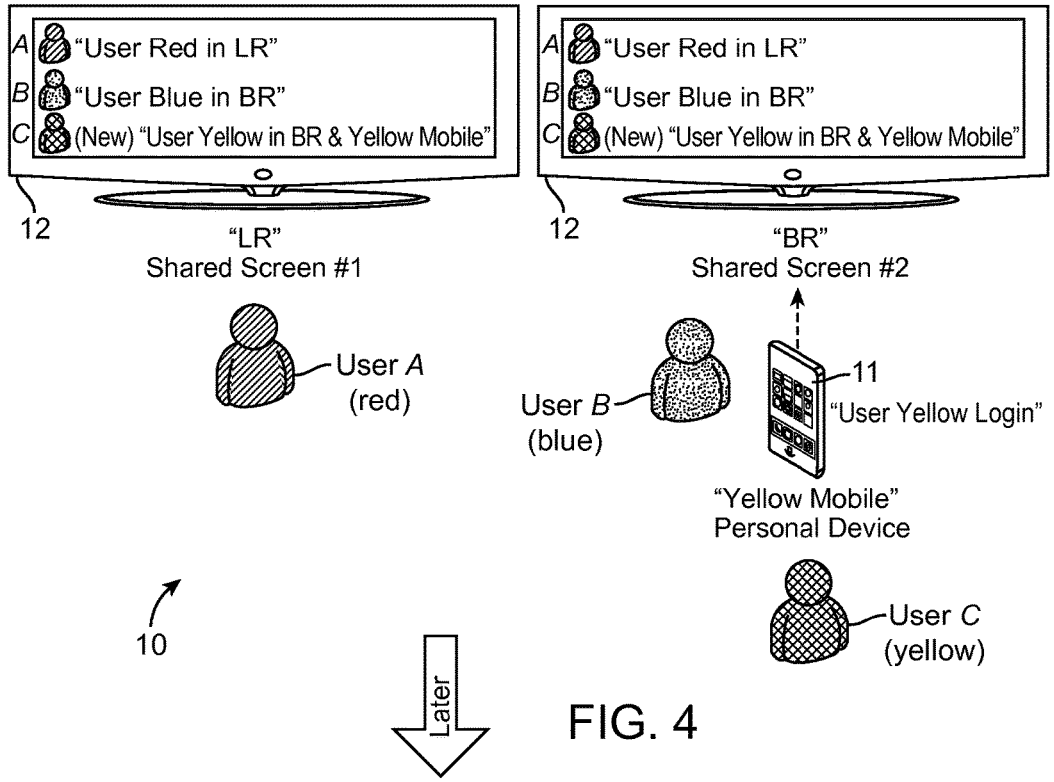
FIGS. 4-5 illustrate example use-cases according to embodiments of the invention, wherein multiple users of shared-screen devices log in/out of a multi-user, multi-device system, using second-screen devices.
Figure 5:
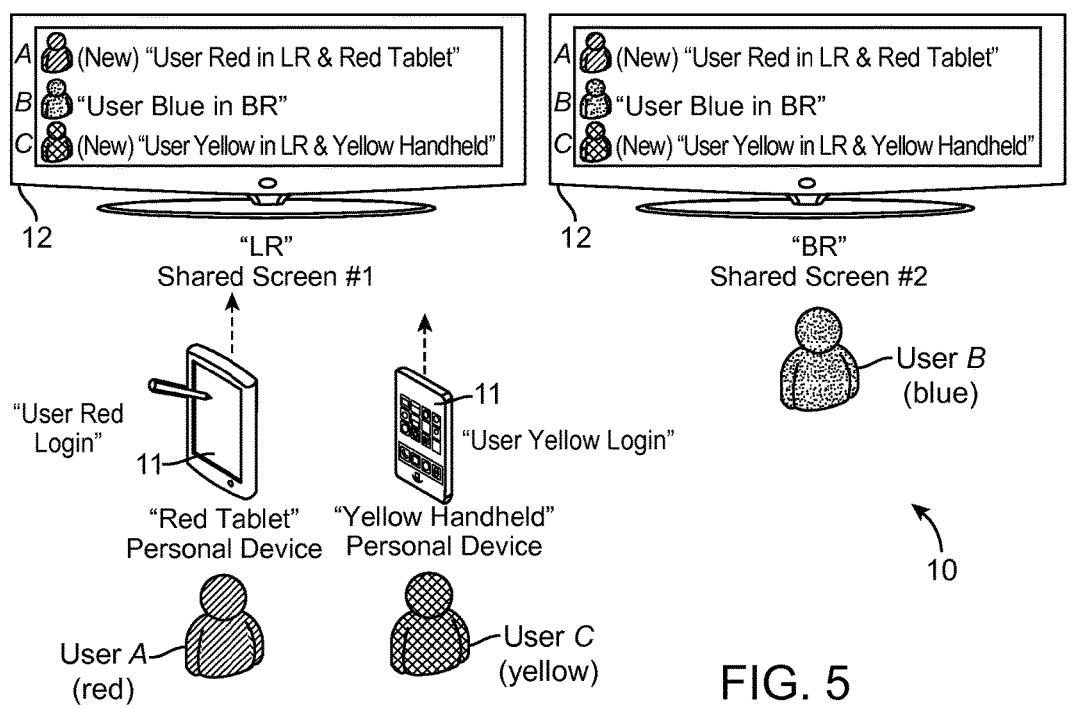

According to embodiments of the invention, in the examples operation scenarios illustrated in FIGS. 4-5:

Logging into a shared-screen device 12 (LR) may cause (optionally) automatic log out from another shared-screen device 12 (BR) based on a condition such as "communal device singleton-flag".

Logging into a personal second-screen device 11 causes log out from a shared-screen device 12.

Logging into a personal second-screen device 11 may cause (not required) log out from another personal second-screen device based 11 on a "personal device singleton-flag".

In one embodiment of the invention, a user may be logged on to only one of each "class" of devices at a time in the network 10 (e.g., one second-screen device and one shared-screen device). In another embodiment of the invention, a user may be logged onto multiple second-screen devices but only one shared-screen device (or in yet other embodiments, vice-versa).

In another embodiment of the invention, there may be a setting (e.g., stored in the shared-screen devices and replicated between them using the cycle through modules 12G to 12C to 12F to 12G (FIG. 3A)), indicating that specific users may only be logged onto a single shared-screen device or a single second-screen device. This setting may be user specific or system specific. Such information may be stored, for example, in the same repository as the module 12G, either using the module 12G or using an additional module with identical placement to the module 12G.

Figure 6A:
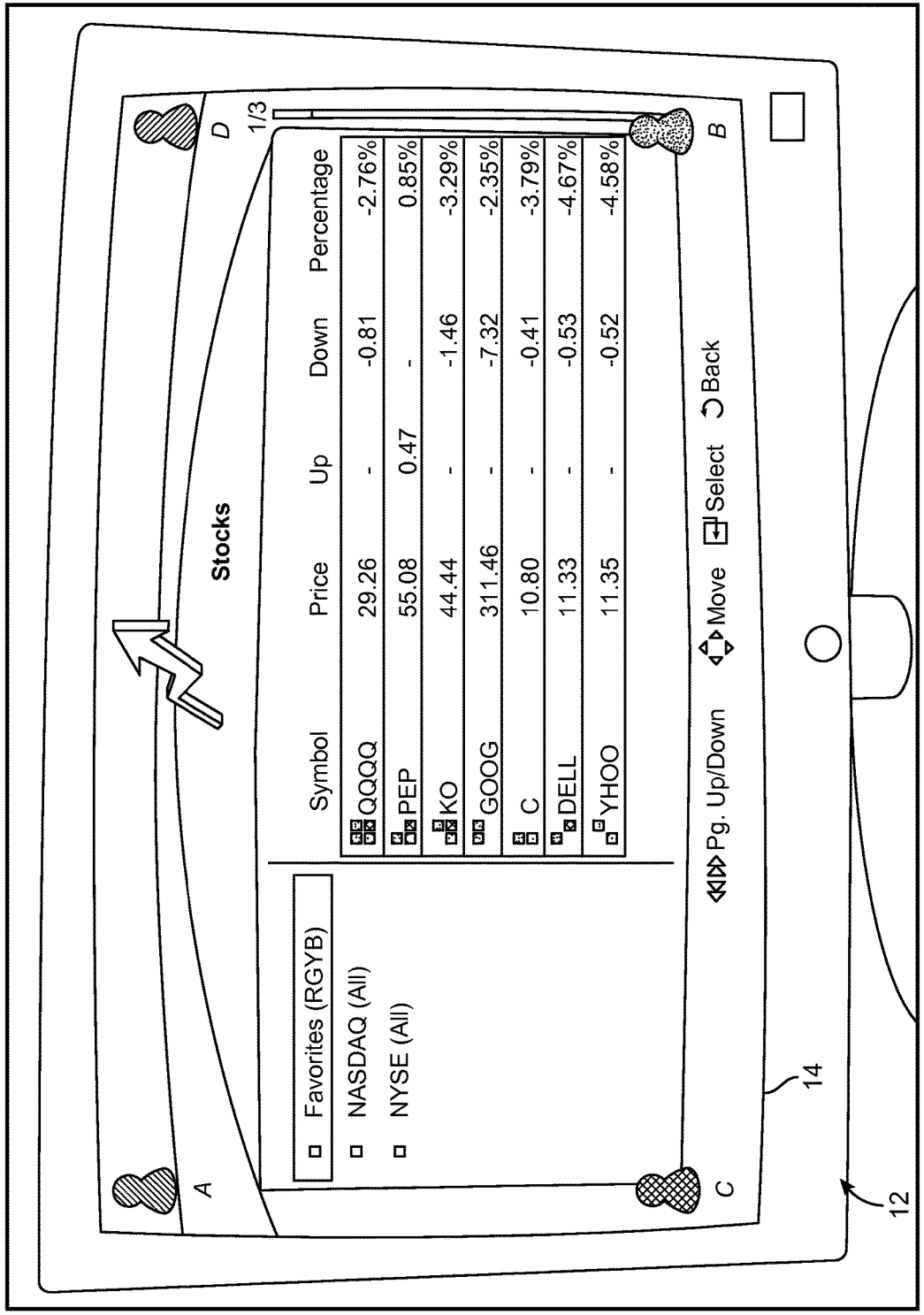
FIGS. 6A-6B illustrate example user interface representations for use-cases in a multi-user, multi-device login system wherein multiple users of shared-screen devices and personal second-screen devices log in/out of the system, according to embodiments of the present invention.
Figure 6B:
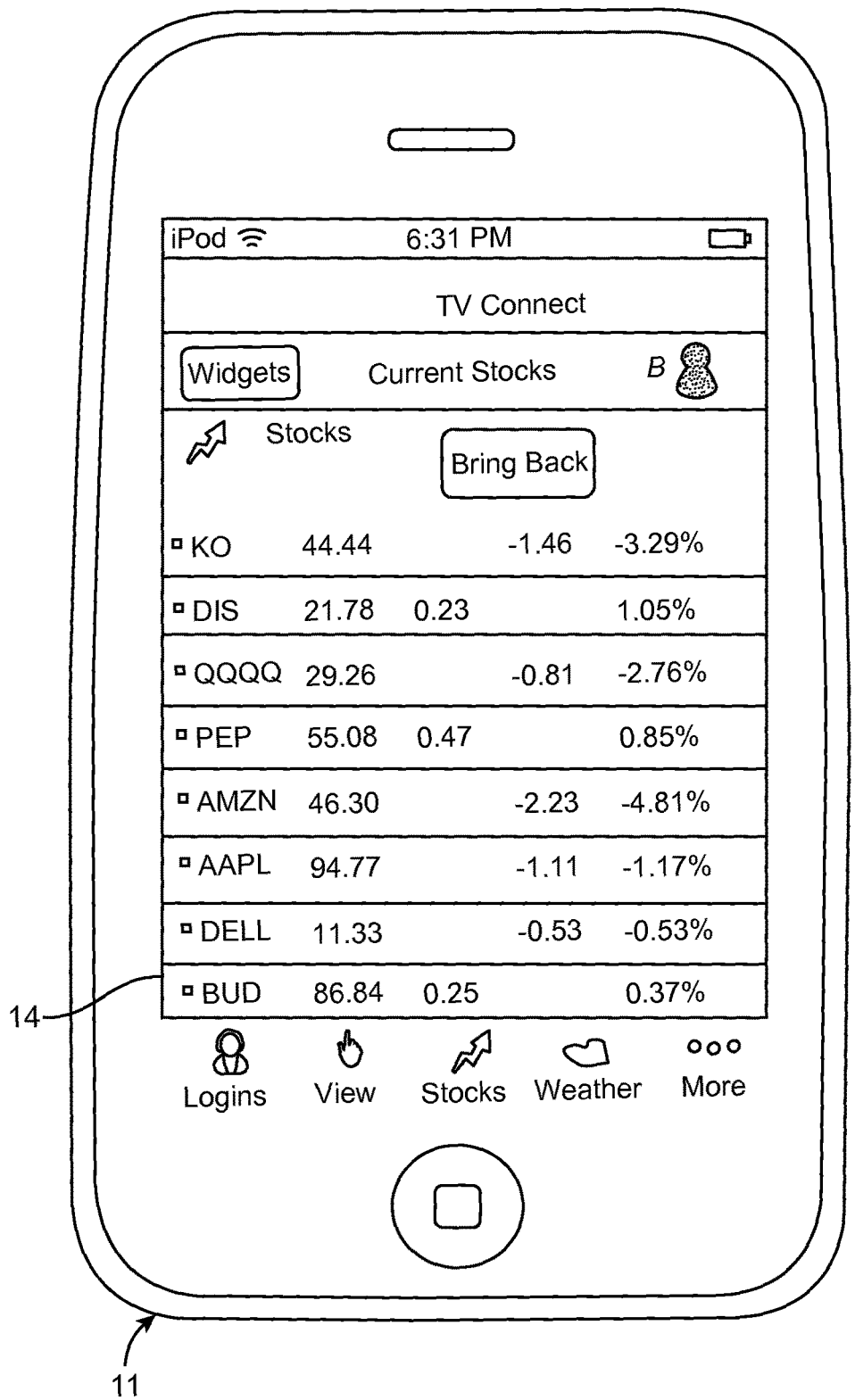

FIGS. 6A-6B illustrate example user interface representations for use-cases in the network 10 wherein multiple users of shared-screen devices 12 and personal second-screen devices 11 access the network, according to embodiments of the present invention. The interactions/presentations are presented differently among shared-screen devices 12 (e.g., television shown in FIG. 6A) and personal second-screen devices 11 (e.g., mobile electronic device shown in FIG. 6B). For example, FIG. 6A shows a user interface display 14 on a television device 12, illustrating icons representing multiple users A, B, C and D logged into television device 12, along with other video content (e.g., multi-user stock (personal stock, shared stocks, etc.)).

FIG. 6B shows a user interface display 14 on a mobile device 11, illustrating icons representing logged in user B, along with other video content, wherein user B is concurrently logged into the television device 12 and the mobile device 11. In this example, the television 12 displays video content comprising information on financial stocks from all users A, B, C and D, while mobile device 11 in use by user B displays video content comprising only personal stock information for user B.

Figure 7:
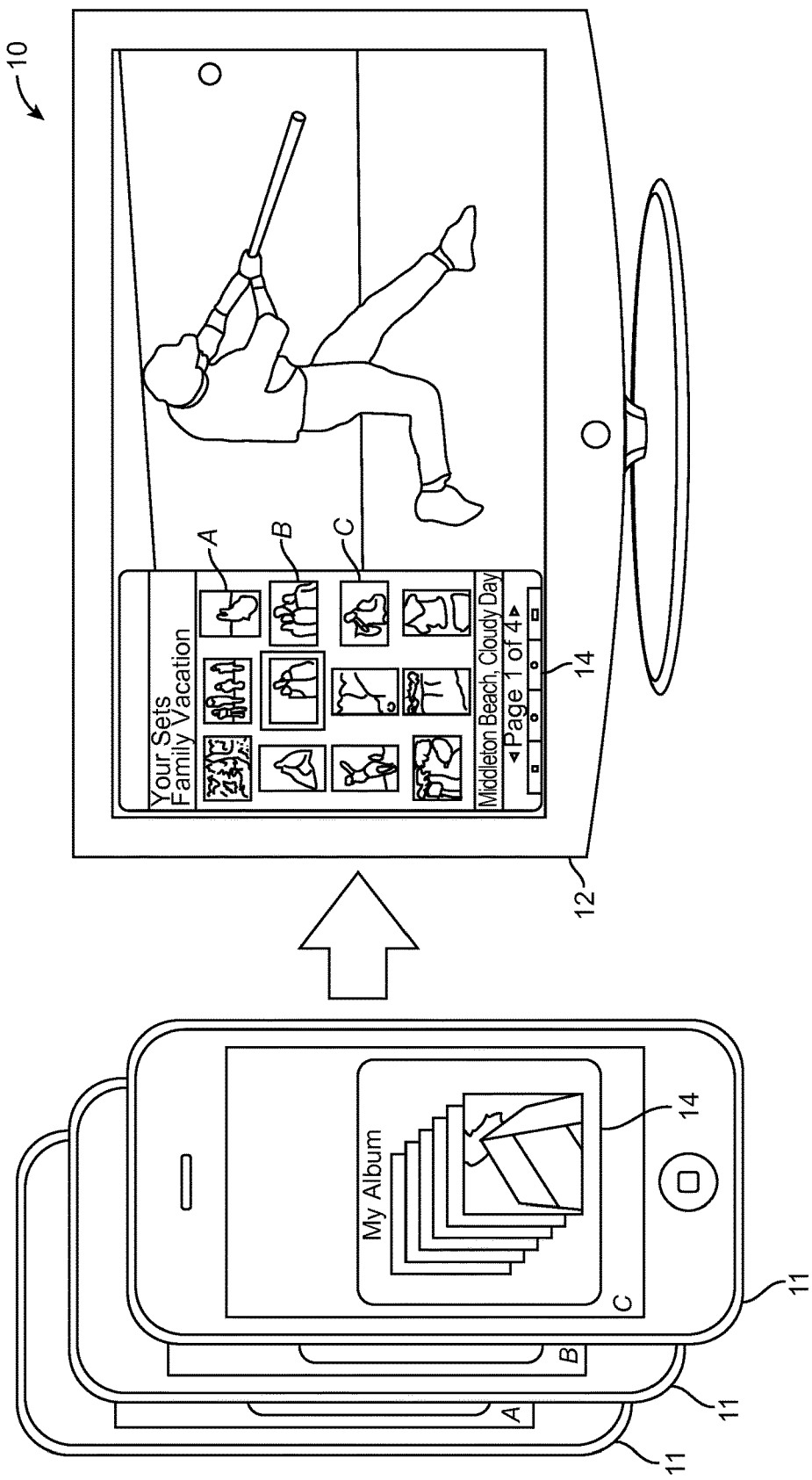
FIG. 7 illustrates a scenario, wherein multiple users utilize an application when logged into a shared-screen device, while concurrently each of the users is individually also logged into their own personal mobile device, in a multi-user, multi-device login system, according to an embodiment of the invention.

FIG. 7 illustrates a scenario according to an embodiment of the invention, wherein multiple users (e.g., Users A, B, C, . . . ) utilizing a photo sharing application when logged into the shared television device 12 in the network 10, while concurrently each of the users is individually also logged into their own personal mobile device 11. All photo albums of all logged in users are displayed in a user interface 14 on television device 12, while a personal photo album of each user is displayed on the handheld device 11 (e.g., using media Share, personal photo, shared photos).

Figure 8:
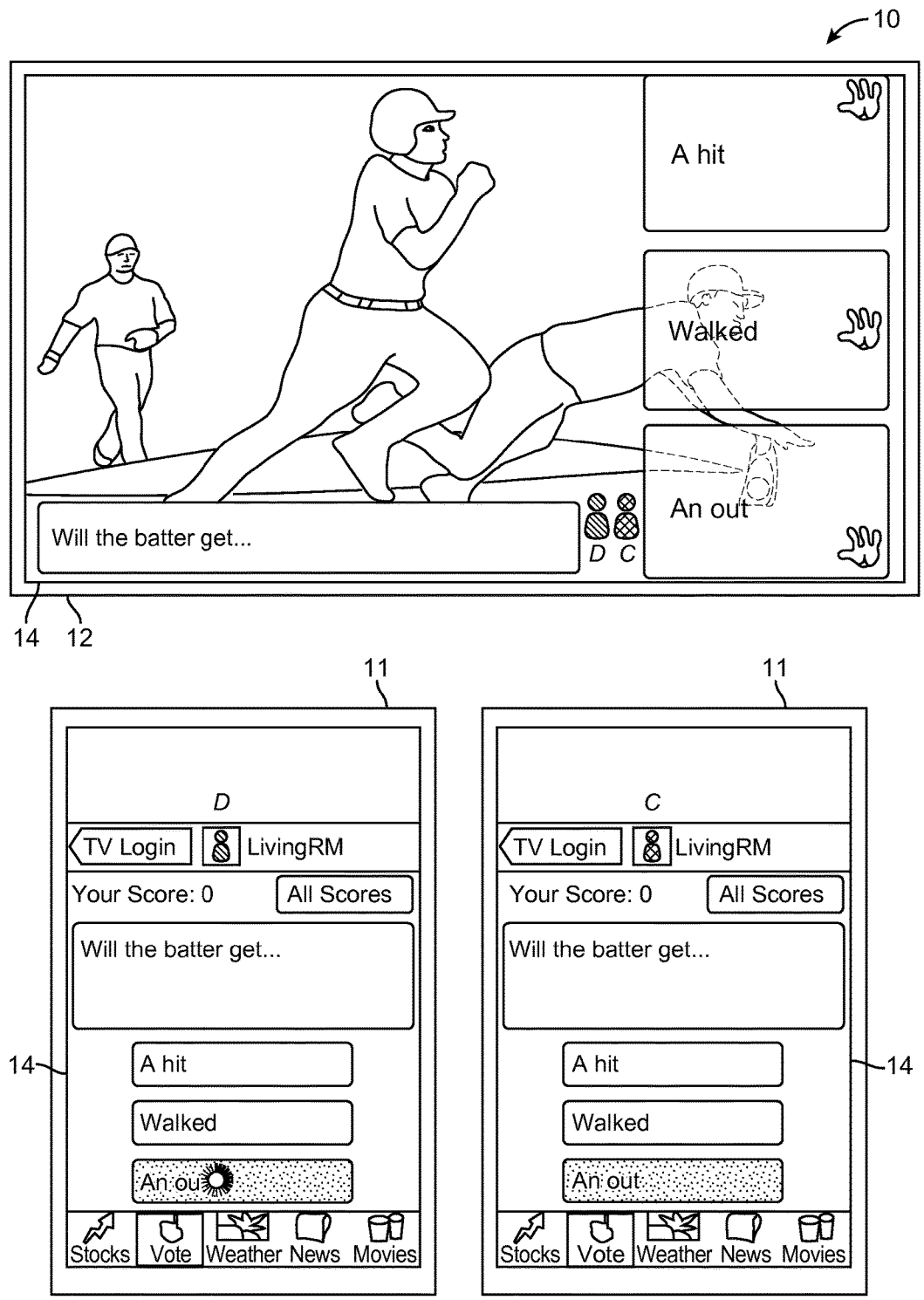
FIG. 8 illustrates a scenario, wherein multiple users are logged into a shared-screen device and also logged into their own respective personal mobile second-screen devices, in a multi-user, multi-device login system, according to an embodiment of the invention.

FIG. 8 illustrates a scenario according to an embodiment of the invention, wherein users C and D are logged into a shared-screen television device 12 displaying a user interface 14, and also logged into their own respective personal mobile second-screen devices 11, in a network 10. When an interaction between the users occurs (e.g., vote on the outcome of a sports match on the display screen), the television device 12 displays and processes both user C and user D interactions together, while each personal mobile device 11 only displays and processes the interactions of its associated user individually.

In one embodiment of the invention, content blocking and metering involves content access policies that are implemented such that access to inappropriate content using a device in the network 10 may be blocked based on the totality of users logged onto the network 10 using a set of currently selected rules and sharing schemes comprising sharing formulas for simultaneous use. In one example, said simultaneous use comprises simultaneous access to content by multiple users via device. In one embodiment, content access policies comprise:

access rule sets, content access metering rules (credit consumption rates), such as number of credits per minute deducted from a user's allowance based on content appropriateness as indicated within a broadcast stream.

sharing formulas indicating how credits are consumed when multiple users are watching content together (e.g. split credit consumption rate between all users).

metering limitations, remaining usage corresponding to user's watching credits (allowance), etc.

In one embodiment of the invention, content access metering is performed based on a selected sharing formula. In one example, the content access metering is spread across multiple simultaneous users. In one embodiment, metering involves a credit consumption metering in relation to usage accounts for multiple users, automatically synchronized across multiple devices in the network 10. Content access (or usage) metering can be shared fairly between multiple users of varying ages or maturity levels when they are together while accessing content via a device (e.g., a communal TV 12) in the network 10. In one embodiment, metering limits for each user are enforced across all of the devices within the network 10, preventing a user from manipulating the access control policies by switching between devices in the network to maximize usage limits.

In one embodiment, based on selected rule sets utilized by the access control module 25, shared usage (e.g., watching appropriate TV content with an older/younger sibling in a family) can be incentivized (or dis-incentivized) based on the selected rule sets, by altering the metering formulae. An example metering approach involves a credit mechanism where fewer credits are charged to an older sibling when watching with younger siblings.

As such, an embodiment of the invention enables parental control of access to content via devices in the network 10, by metering of usage based on criteria of appropriateness and blocking of device access or usage based on criteria of appropriateness and past usage. An administrative user (e.g., a parent) creates accounts for each metered user (e.g., child), and enters or selects one or more rule sets for defining the parental control limits and formulae for metering. A user then logs in to a device with the user accounts being synchronized across all of the devices in the network 10, wherein one or more devices allow multiple simultaneous logins. Based on the users logged into a device, the rule sets are analyzed to determine whether metering or blocking is appropriate for one or more of such users, and the sharing formulae selected to determine the metering limitations based on the plurality of users currently on the device is applied.

Figure 9:
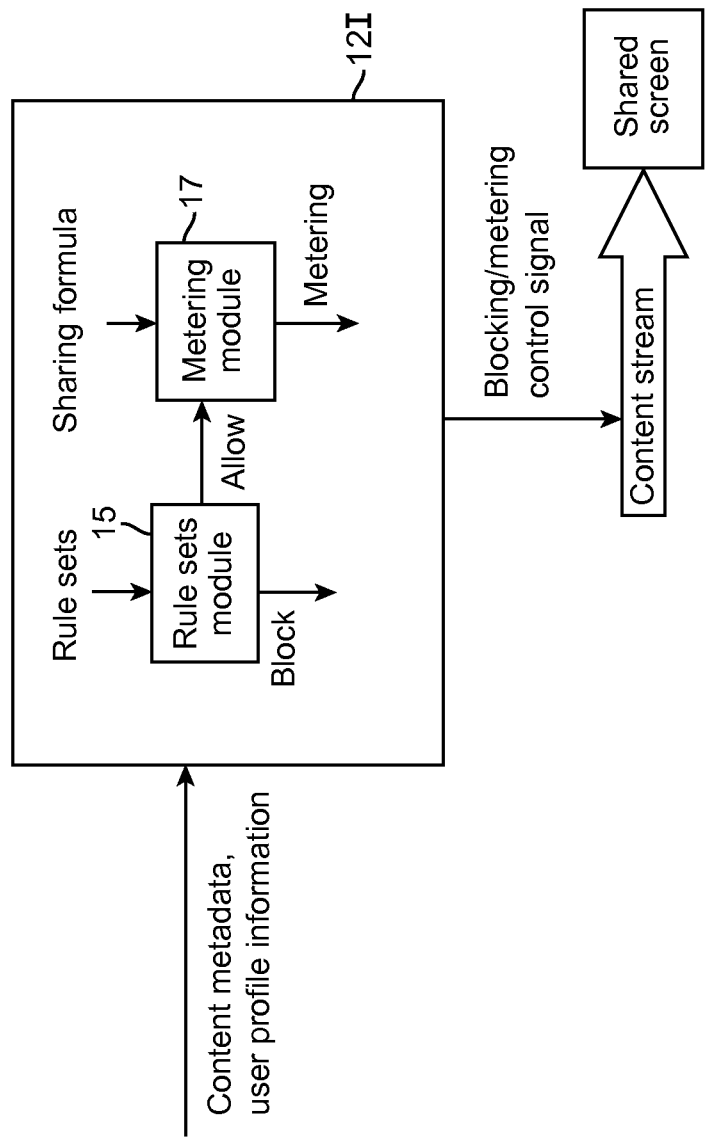
FIG. 9 shows a block diagram of an access control module implementing content blocking and metering, according to an embodiment of the invention.

An implementation of a blocking and metering module 12I (FIG. 3A), according to an embodiment of the access control module 25 is now described in conjunction with the block diagram in FIG. 9, according to an embodiment of the invention. When a user request initiates a content access action via a device in the network 10 to access desired content, content metadata for that desired content (i.e., requested or current content), and user(s) profile information (e.g., user age) are provided as input(s) to the blocking and metering module 12I implements rule sets module 15 (FIG. 9). Based on these inputs, the rule sets module 15 determines whether to apply blocking of the requested content altogether or to allow access to that content and apply metering via a content access metering module 17. A content access action for desired content may comprise, for example, turning on a TV device 12, changing TV channel, starting viewing video content stored in the network, etc.

In the event of metering, a sharing formula is used to determine the usage limit for each of the users logged in to a device. In one embodiment, metering limitations, remaining usage, user profiles, rule sets, and sharing formula are stored in an internal user profile storage 12H shared between all devices within the network 10. As such, that users logging in to separate devices find the same rules and limitations in effect, and cannot extend their usage by switching devices at appropriate intervals.

In one embodiment, when the usage limits are reached, the content being accessed is blocked. Based upon the rule sets and sharing formula, if the usage limits have been exceeded for only a some of simultaneous users (e.g., if one child has exceeds his limit and another child has not) the rule set and formula are consulted to determine whether the content that such users are accessing together (consuming) should be blocked.

Figure 10:
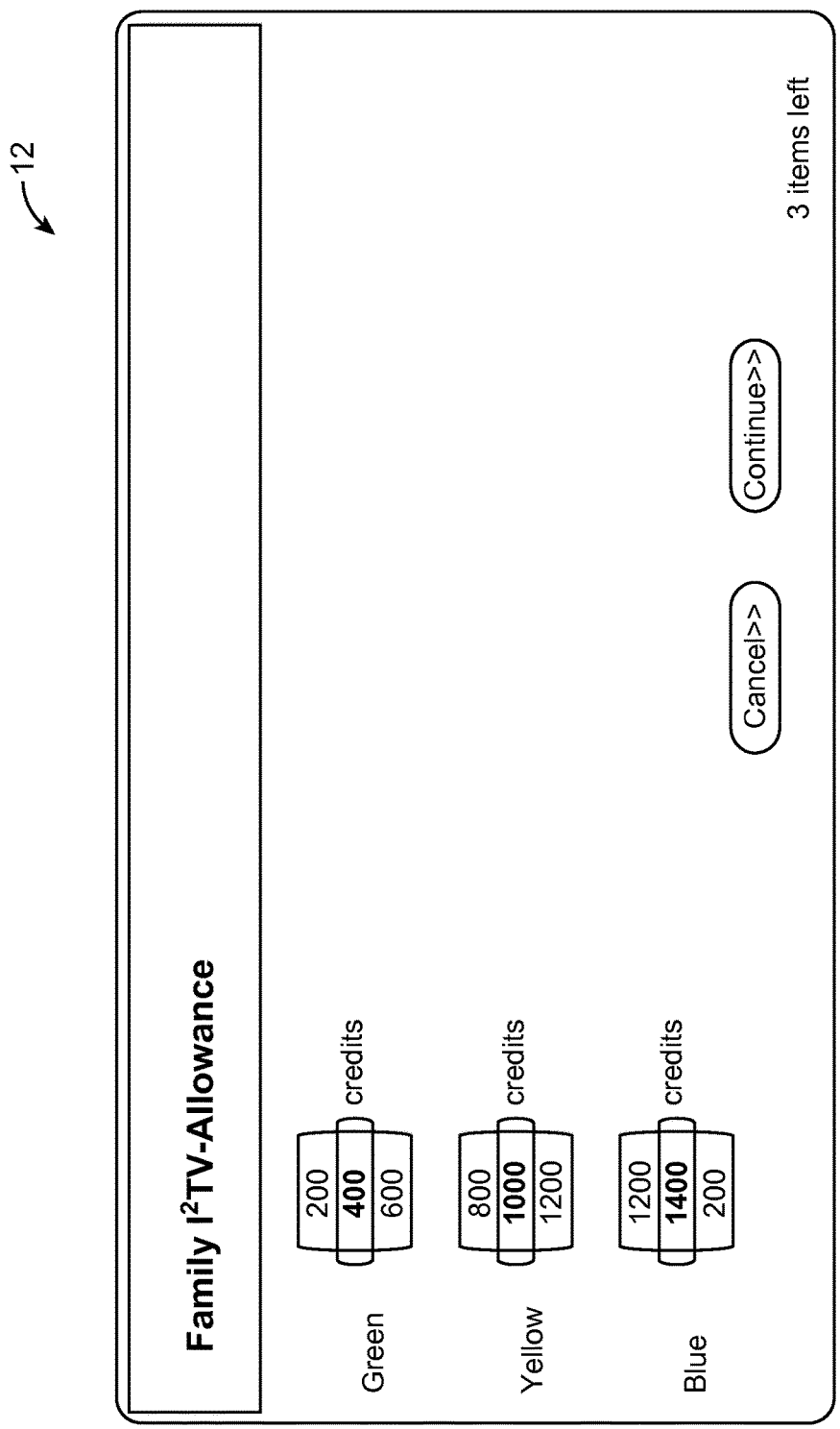
FIG. 10 shows an example display screen for content blocking and metering set-up, according to an embodiment of the invention.

An implementation of blocking and metering for parental control of access to content via devices in a network is described below for an example network environment comprising networked devices such as network-connected televisions in said network 10. Such televisions may comprise display-connected devices that are network-connected digital televisions (DTVs) interconnected to each other via Ethernet or Wi-Fi wireless network. FIG. 10 shows an example display screen of a television device 12 in the network 10, designated as Family I$^2$TV, for content blocking and metering set-up according to an embodiment of the invention. In one example, each user is assigned a color (e.g., green, yellow or blue). One or more of the users are children of various age groups.

During initial set-up, parents enter birth dates or age groups for each child, and then assign them a "credit" allowance per week. The age-groups are used for matching with parental control rule sets, wherein metering is performed using consumption credit balances for each user. Provided that the content is not blocked (e.g., as determined by the rule sets module 15 by application of rule sets to the content metadata), children logged into the network consume credits for access to allowed content, at a rate based on the combination of users, rule set matching, and sharing formula. If insufficient credits remain, then the content is blocked.

FIG. 10 illustrates an example of an initial set-up screen for Family I²TV, wherein parents assign a weekly credit allowance to each user (e.g., 400 credits for user Green, 1000 credits for user Yellow, 1400 credits for user Blue, etc.). In this example, the credits correspond to an amount of time per week that a user may watch age-appropriate content. In this example, credits are utilized rather than time units (e.g., minutes) to implement a sliding-scale credit consumption rate wherein credits for a user are consumed faster for viewing inappropriate content and slower for viewing appropriate content. Credit consumption rates for each user are also used to illustrate the impact of a sharing formula. In one embodiment, a sharing formula decreases the credit consumption of children if they watch appropriate content together on a device 12 in the network 10. Different networks according to embodiments of the invention may use credits, or another metering approach (e.g., time), and may have sharing formula which encourage or discourage watching together, etc.

Figure 11:
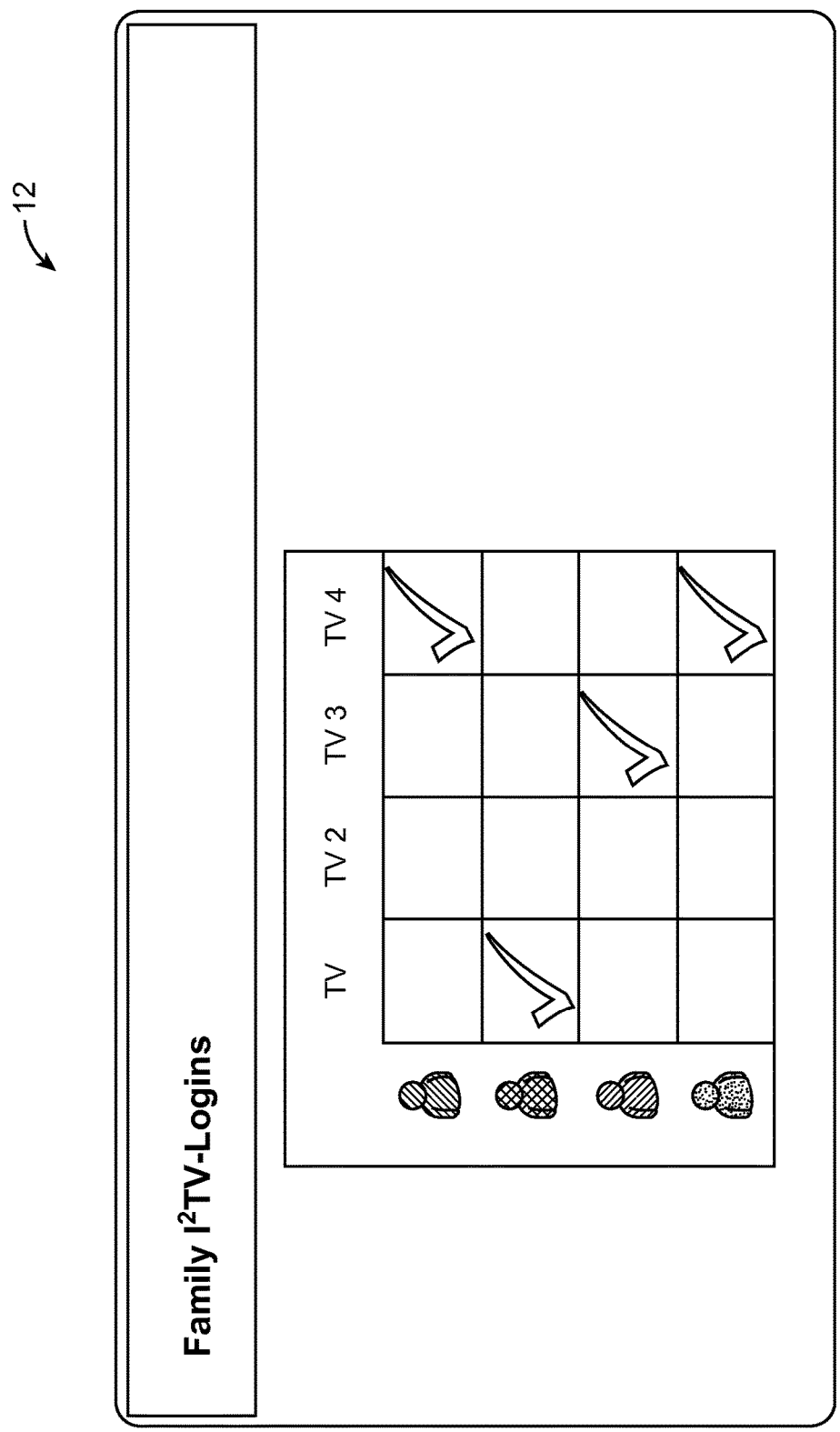
FIG. 11 shows an example status screen illustrating multiple simultaneous user logins, according to an embodiment of the invention.

Multiple users can log on to each device in the network 10. FIG. 11 illustrates an example status screen showing multiple simultaneous user logins, according to an embodiment of the invention. In this example there are four TV devices 12 (e.g., TV, TV 2, TV 3, TV 4) in the network 10, with check marks indicating which user is presently logged on to each of the four device 12. Based on this user information, the blocking and metering 12I determines whether to block or meter content, and how to do so, as described herein according to embodiments of the invention.

Figure 12:
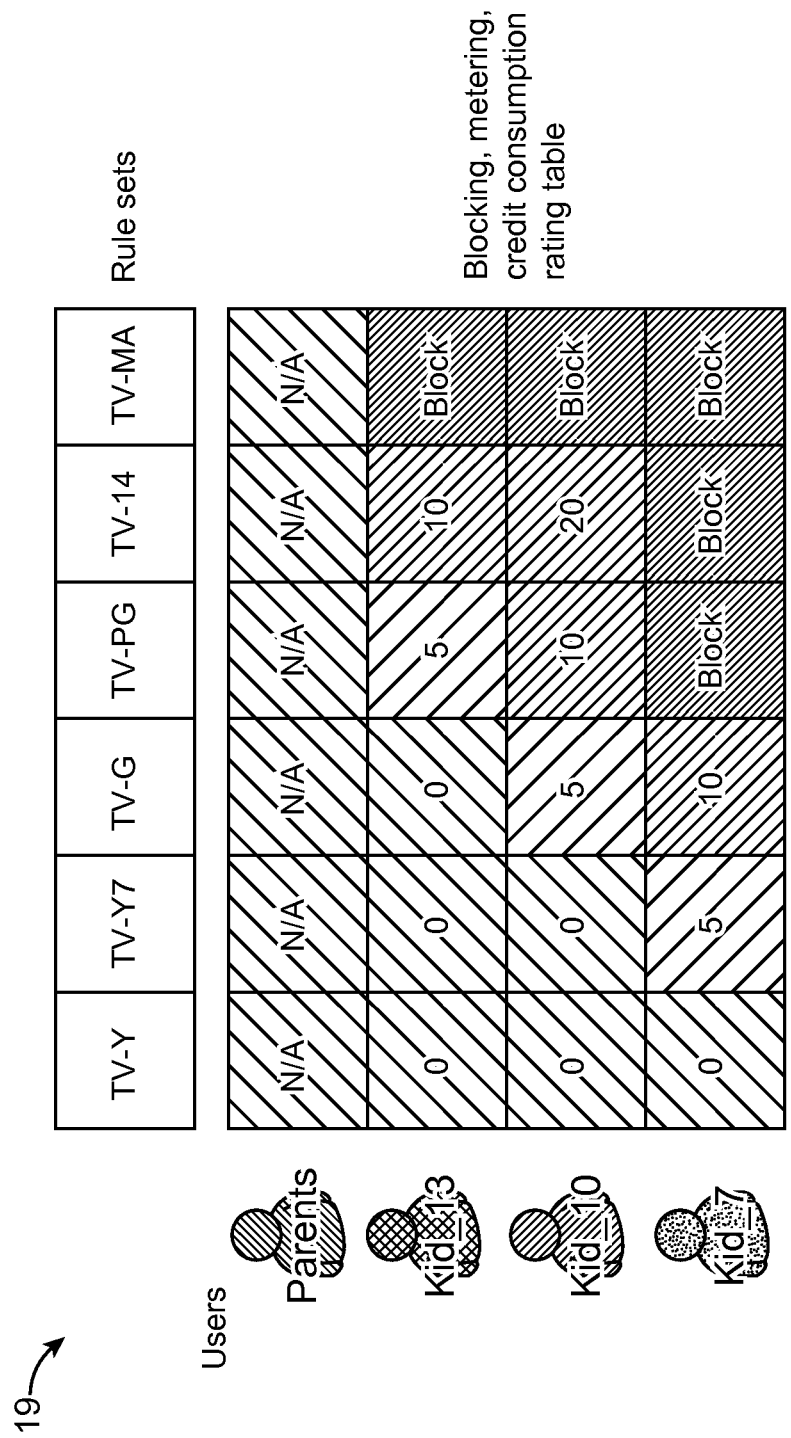
FIG. 12 shows a chart indicating a blocking and metering process, according to an embodiment of the invention.

FIG. 12 illustrates a chart 19 indicating example blocking and metering process implemented by the blocking and metering module 12I for individual users logged into a network 10, according to an embodiment of the invention. The blocking and metering process is based on an example rule sets comprising content access rules based on user age. An example rules set comprises FCC V-chip content rating system including TV-Y, TV-Y7, TV-PG, TV-14, TV-MA, wherein:

TV-Y: All children (ages 0-6).
TV-Y7: Children 7 and up.
TV-G: General audience (suitable for children and adults).
TV-PG: Parental guidance suggested (violence, sexual situations, coarse language and/or suggestive dialogue).
TV-14: Parents strongly cautioned (content may be unsuitable for children under 14 years of age, intense violence, sexual situations, coarse language and/or suggestive dialogue).
TV-MA: Mature Audience Only (content unsuitable for audiences under 17, graphic violence, explicit sexual content and/or offensive language).

The chart 19 shows the result of applying example content blocking rules and content access metering rules for television content for four concurrently logged in users in the network 10 (e.g., a parent as user Parents, a child age 7 as user Kid_7, a child age 10 as user Kid_10, and a child age 13 as Kid_13).

In the chart 19, "N/A" indicates not applicable, "Block" indicates that content of a particular rating is blocked for a certain user, and the numbers (e.g., "5", "10", "20") indicate rate of credits consumed per minute of content watched for a user when that user is watching content on a device alone. Chart 19 provides example credit consumption rates that indicate credit consumption rate for family members based on role (e.g., parent, child) and age. Multiple parents and children may login to the network 10 concurrently using one or more devices, wherein the blocking and metering 12I generates different credit consumption rates for users individually and/or the family as a whole.

Figure 13:
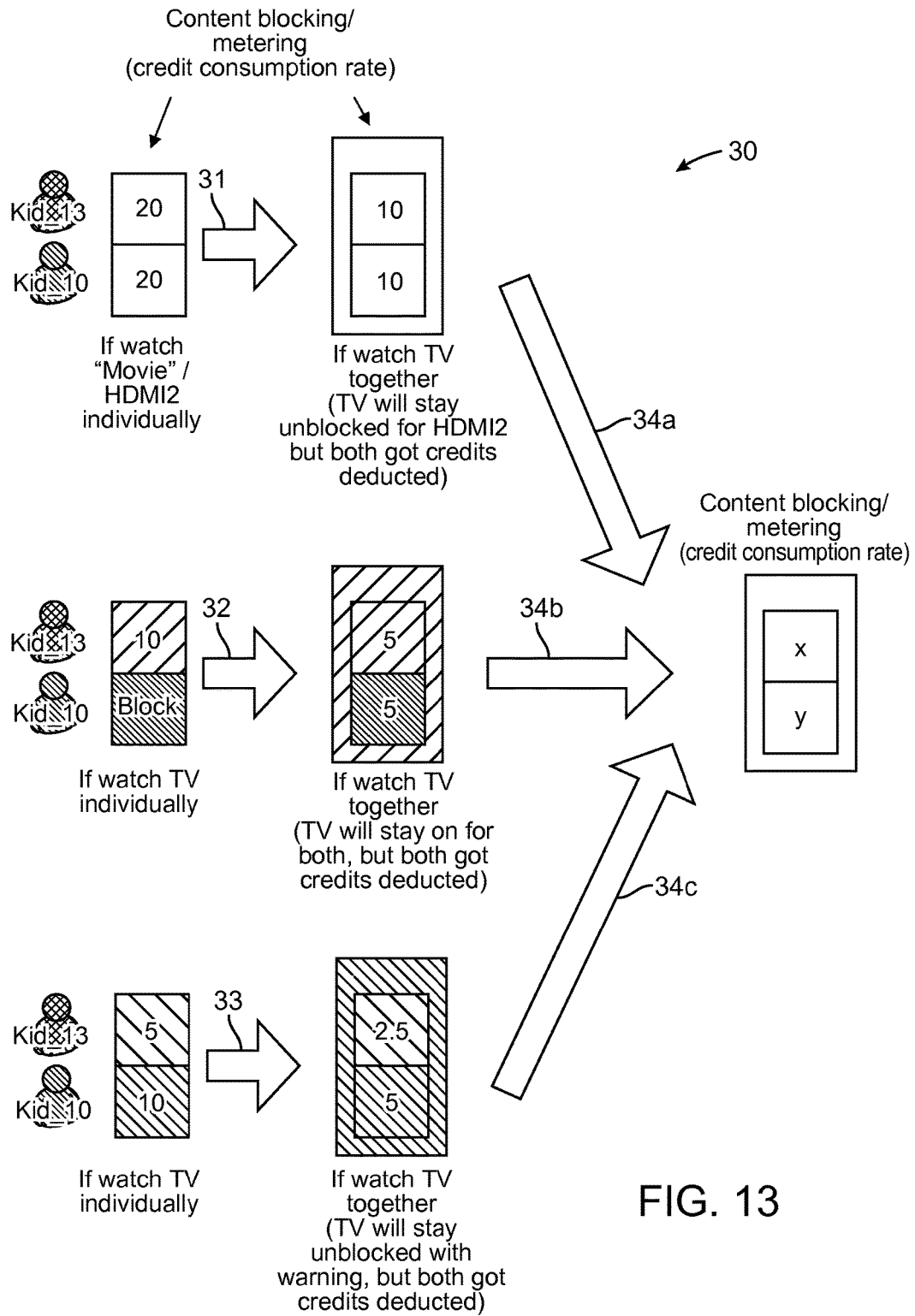
FIG. 13 illustrates a blocking and metering process using a multi-user rule set and sharing scheme, according to an embodiment of the invention.

FIG. 13 illustrates a content access process 30 implemented by the blocking and metering 12I, for content blocking and metering using a multi-user rule set and sharing formula by the blocking and metering 12I, according to an embodiment of the invention. This example involves users Kid_10 and Kid_13, and an instance of a rule set and varying credit consumption rates based on content sharing formulas. Process block 31 indicates a first example sharing formula that involves change in credit consumption rates, wherein if users Kid_10 and Kid_13 watch certain allowed content individually (i.e., using different TVs in the network 10) the credit consumption rates for them is 20, and but if users Kid_10 and Kid_13 watch said allowed content together on the same device (i.e., sharing a device and content) the credit consumption rate for each user is reduced to 10. As such, user Kid_10 and Kid_13 are incentivized to watch the content on the same device together.

Process block 32 indicates a second example sharing formula such that if users Kid_10 and Kid_13 attempt to watch certain content individually using different devices the user Kid_13 has a credit consumption rate of 10 and user Kid_10 is blocked, but if users Kid_10 and Kid_13 watch said content together on the same device the credit consumption rate for user Kid_13 is reduced to 5, and the credit consumption rate for user Kid_10 is set at 5.

Process block 33 indicates a third example sharing formula such that if users Kid_10 and Kid_13 attempt to watch certain content individually using different devices the user Kid_13 has a credit consumption rate of 5 and user Kid_10 has credit consumption rate of 10, but if users Kid_10 and Kid_13 watch said content together on the same device the credit consumption rate for user Kid_13 is reduced to 2.5 and the credit consumption rate for user Kid_10 is reduced to 5.

Process blocks 34a, 34b and 34c indicate that rules utilized in two or more of process blocks 31, 32, 33 can be combined in various ways (along with other rules) for content blocking and metering for each user (e.g., a credit consumption rate x for Kid_13 and y for Kid_10), and each device being utilized for access to content, based on a sharing formula. Examples include TV On/Off, content blocked/allowed, user credit consumption rate settings/adjustments.

In one embodiment of the invention, the rule set and sharing formula applied can be selected by experts such as supplied using downloadable configurations. This can provide a superior experience by alleviating the need for parents to create a rule set and select an appropriate formula (such tasks can be left for experts and then downloaded to the network 10 as desired).

Table 1 blow shows additional examples of content access rules and sharing logic for monitoring and controlling access to content and content sharing scheme, according to embodiments of the invention.

TABLE 1

Patterns for Family Matching in monitoring and controlling access to content

Experts Selections
    Which experts and their ratings/weights
Family Settings
    Blocking
        Rating Tables
        Service Types
        Calendar
        Device Types
        Channels
    Credit Allowances
        Daily
        Weekly
        Monthly
        Chores
        Goals/Achievements
    Burn-Rates
        Rating Tables
            Blocked TV Ratings
            Blocked MPAA
            Blocked RTT
            Blocked ESRB
        Service Types
            TVs Type
            Movies Type
            Games Type
            Widgets/Apps Type
        Calendar
            Hours in Weekday
            Hours in Weekend
            Special Day/Event
        Device Types
            Personal (TV in own bedroom)
            Communal (TV in living room)
    Multiple Users Weights/Offsets
        Multiple Ages (Older & Younger)
        Multiple Gender (Boy & Girl)
        Multiple Types (Parents & Kids)
    Family Geographic Weights/Offsets
        Zipcode
        Region
        State
    Family Demographic Weights/Offsets
        Number of Kids
        Kids Age Bracket
        Gender Percentage (33% Boy, 66% Girl)
        Income Bracket
        Ethnicity
    Family Social Affiliation Weights/Offsets
        Religion
        Magazine
        Activities
        Clubs
Family Interaction Histories
    Multi-Device, Multi-User Login History
        Which kids login together . . . when, how often, etc.
        When parents and kids login together . . . when, how often, etc.
    Users/Family Credits Usage History
    Users/Family Show Rating History
    Users/Family Devices Usage Schedule History Accordingly, embodiments of the invention provide a system-wide support mechanism for the active users and allow multiple devices that share a communication mechanism to use the same pool of user profiles. The system-wide support mechanism manages user logins and content access blocking and metering between the multiple users and multiple devices. Support for login through other mechanisms such as a second-screen device is also provided. Users may share the same display, and may interact. Users may also view the login-state of other users.

In another embodiment of the invention, there may be multiple types of communal or shared devices (e.g., a television and a jukebox-like device). In such an embodiment, each user may be logged into one instance of each type of shared device, rather than merely to one personal second-screen device and a single shared-screen device. A "shared-screen" need not be only a device whose primary function is as a visual display. A multi-user jukebox device connected to the multi-user, multi-device network 10, according to an embodiment of the invention, may serve as a "shared-screen" device even if it has no standard monitor-type display.

According to embodiments of the present invention, the terms "mechanism" and "module" as used herein include architectures such as program instructions for execution by a processor, as software modules, microcode, as hardware modules, as computer program product on computer readable media, as logic circuits, as application specific integrated circuits, as firmware, etc. Further, embodiments of each mechanism or module can take the form of an entirely hardware embodiment, an entirely software embodiment or an embodiment containing both hardware and software elements.

Embodiments of the present invention provide a system implementing a process that allows multiple users to share the same user profile information between multiple electronic devices sharing a communication mechanism (e.g., a network), and for users of each device to determine at-a-glance the login status of users on other devices. In addition, the support of multiple different devices, and multiple login mechanisms (including the "second-screen" devices) enables users to interact more freely with the devices in the network. Communication of login information between the different devices in the system allows a login control system/module in the multi-device system to keep track of, and display on multiple display screens, information about which devices various users are using, and take appropriate action including, for example, logging a user out of one "shared-screen" device when the users log in to a different "shared-screen" device in the system. The login control system/module further manages login state between devices in the system without the need for an authentication server or "domain controller" such as in complex business systems.

Figure 14:
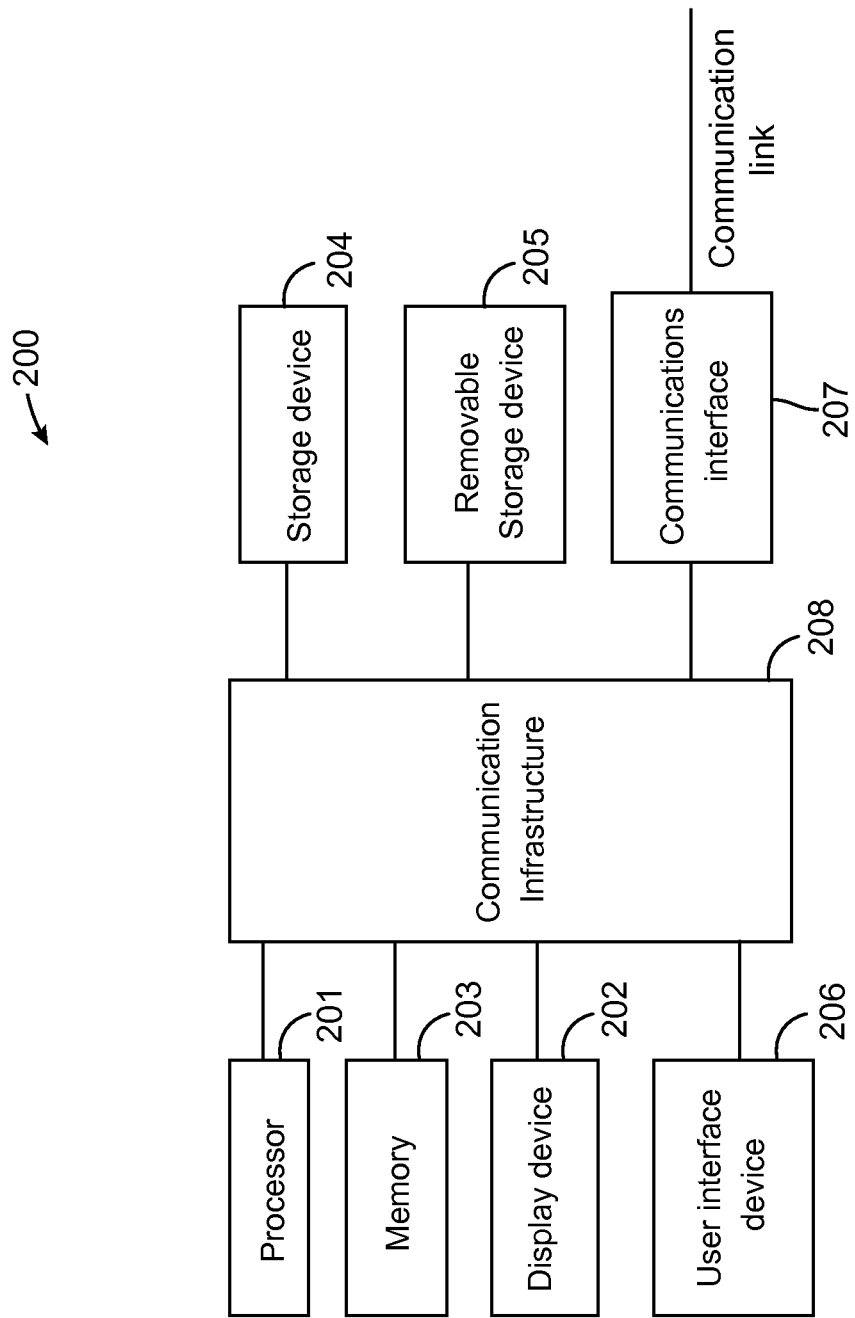
FIG. 14 shows a high level block diagram showing an information processing system comprising a computer system useful for implementing an embodiment of the present invention.

FIG. 14 is a high level block diagram showing an information processing system comprising a computer system 200 useful for implementing an embodiment of the present invention. The computer system 200 includes one or more processors 201, and can further include an electronic display device 202 (for displaying graphics, text, and other data), a main memory 203 (e.g., random access memory (RAM)), storage device 204 (e.g., hard disk drive), removable storage device 205 (e.g., removable storage drive, removable memory module, a magnetic tape drive, optical disk drive, computer readable medium having stored therein computer software and/or data), user interface device 206 (e.g., keyboard, touch screen, keypad, pointing device), and a communication interface 207 (e.g., modem, a network interface (such as an Ethernet card), a communications port, or a PCMCIA slot and card). The communication interface 207 allows software and data to be transferred between the computer system and external devices. The system 200 further includes a communications infrastructure 208 (e.g., a communications bus, cross-over bar, or network) to which the aforementioned devices/modules 201 through 207 are connected.

Information transferred via communications interface 207 may be in the form of signals such as electronic, electromagnetic, optical, or other signals capable of being received by communications interface 207, via a communication link that carries signals and may be implemented using wire or cable, fiber optics, a phone line, a cellular phone link, a radio frequency (RF) link, and/or other communication channels. Computer program instructions representing a block diagram, process and/or flowchart herein may be loaded onto a computer, programmable data processing apparatus, or processing devices to cause a series of operations performed thereon to produce a computer implemented process.

As is known to those skilled in the art, the aforementioned example architectures described above, according to the present invention, can be implemented in many ways, such as program instructions for execution by a processor, as software modules, microcode, as computer program product on computer readable media, as logic circuits, as application specific integrated circuits, as firmware, etc. The embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer, processing device, or any instruction execution system. For the purposes of this description, a computer-usable or computer readable medium can be any apparatus that can contain, store, communicate, or transport the program for use by or in connection with the instruction execution system, apparatus, or device. The medium can be electronic, magnetic, optical, or a semiconductor system (or apparatus or device). Examples of a computer-readable medium include, but are not limited to, a semiconductor or solid state memory, magnetic tape, a removable computer diskette, a RAM, a read-only memory (ROM), a rigid magnetic disk, an optical disk, etc. Current examples of optical disks include compact disk-read-only memory (CD-ROM), compact disk-read/write (CD-R/W) and DVD.

I/O devices (including but not limited to keyboards, displays, pointing devices, etc.) can be connected to the system either directly or through intervening controllers. Network adapters may also be connected to the system to enable the data processing system to become connected to other data processing systems or remote printers or storage devices through intervening private or public networks. Modems, cable modem and Ethernet cards are just a few of the currently available types of network adapters. In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

The terms "computer program medium," "computer usable medium," "computer readable medium," and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information, from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer programs (also called computer control logic) are stored in main memory and/or secondary memory. Computer programs may also be received via a communications interface. Such computer programs, when executed, enable the computer system to perform the features of the present invention as discussed herein. In particular, the computer programs, when executed, enable the processor or multi-core processor to perform the features of the computer system. Accordingly, such computer programs represent controllers of the computer system.

Generally, the term "computer-readable medium", as used herein, refers to any medium that participated in providing instructions to a processor for execution. Such a medium may take many forms, including but not limited to, non-volatile media, and volatile media. Non-volatile media includes, for example, optical or magnetic disks, such as a storage device. Volatile media includes dynamic memory, such as a main memory.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention has been described in considerable detail with reference to certain preferred versions thereof; however, other versions are possible. Therefore, the spirit and scope of the appended claims should not be limited to the description of the preferred versions contained herein.

What is claimed is:

1. A device comprising:
a processor; and
a memory storing instructions for execution by the processor, wherein executing the instructions causes the device to:
control display of content for electronic devices in a communication system such that access to the content by multiple users via the electronic devices is controlled, wherein controlling the display of the content is based on executing the instructions to determine content access actions by the electronic devices, and based on content information and user profile information provided to the device, transmit, in response to receiving a login command and update data information for a logged in list, the updated data information to the electronic devices to update state for a plurality of the electronic devices to maintain a consistent state between the electronic devices, wherein a local device login listener of the shared screen device receives login updates from an active user reporter of another shared screen device, and the local device login listener and the active user reporter maintain the consistent state between the shared screen device and the another shared screen device based on replication of all state changes, perform content stream control for the electronic devices to control display of content to the multiple users via the electronic devices based on application of selected metering rules, and a content sharing scheme including sharing formulas for modifying the selected metering rules to control simultaneous use of a shared screen device by the multiple users by shared content metering based on determining a split credit content consumption rate between the multiple users, the content sharing scheme includes information for parental content access rules based on user information and sharing information to determine a parental control usage limit for simultaneous content usage for the multiple users, and control the shared screen device by performing at least one of metering access and blocking access for displaying of the content on the shared screen device for the multiple users by enforcing the selected metering rules, rule sets and the content sharing scheme on the electronic devices and the shared screen device for the multiple users.

2. The device of claim 1, wherein:
the user information includes information relating to user profile and user activity of the multiple users;
the user information is shared between the-electronic devices in the communication system; and
executing the instructions further causes the device to selectively control display of inappropriate content on the shared screen device based on the selected metering rules and the content sharing scheme, and the selected metering rules comprise a configurable set of content sharing rules for allowed content consumption for the multiple users of the shared screen device.

3. The device of claim 1, wherein:
executing the instructions further causes the device to control display of content on the electronic devices by metering display of content for multiple simultaneous users via electronic devices based on the content sharing scheme by altering a metering formula for at least one user of the multiple users, and the content access actions comprise turning on an electronic device, changing a channel for an electronic device, or starting to view video content stored in a network including the electronic devices.

4. The device of claim 3, wherein:
executing the instructions further causes the device to maintain usage accounts for the multiple users and to automatically synchronize the usage accounts across multiple electronic devices, and
content metering limits for each user are enforced to control the electronic devices within the network.

5. The device of claim 4, wherein:
executing the instructions further causes the device to control display of inappropriate content on the shared screen device based on a totality of users accessing content and the content sharing scheme for simultaneous use by concurrent users having varying controlled access.

6. The device of claim 1, wherein:
the communication system comprises a network; and
executing the instructions further causes the device to track presence of multiple users via the electronic devices across the network, and to apply the selected metering rules to control the shared screen device;
the selected metering rules comprise a configurable set of content sharing rules for controlling the display of the shared screen device to meter and block content on the shared screen device based on a list of users utilizing the shared screen device and usage history for each user across all electronic devices in the network.

7. The device of claim 6, wherein executing the instructions further causes the device to control display of the content on the shared screen device to meter usage between multiple users of varying ages and having varying maturity level access for parental control.

8. The device of claim 7, wherein executing the instructions further causes the device to control the electronic devices to provide content access limits for a user and to enforce the limits across the electronic devices in the network based on user usage limits for the electronic devices.

9. The device of claim 8, wherein executing the instructions further causes the device to control display of content on the shared screen device to selectively meter content access for a user based on the configurable set of content sharing rules to provide an incentive for content consumption based on concurrent shared access with another particular user.

10. The device of claim 9, wherein each electronic device allows multiple users to be logged on or logged off a particular electronic device concurrently, and executing the instructions further causes the device to provide sharing user profiles and activity between multiple electronic devices.

11. A non-transitory processor-readable medium that includes a program that when executed by a processor performs a method comprising:
controlling electronic devices to control access to content by multiple users based on an access controller device determining parental control content access actions via electronic devices that communicate in a communication system and based on provided content information and user profile information;
transmitting, in response to receiving a login command and updating data information for a logged in list, the updated data information to the electronic devices to update state for a plurality of the electronic devices to maintain a consistent state between the electronic devices, wherein a local device login listener of the shared screen device receives login updates from an active user reporter of another shared screen device, and the local device login listener and the active user reporter maintain the consistent state between the shared screen device and the another shared screen device based on replication of all state changes;
performing content stream control for the electronic devices for controlling display of content to the multiple users via the electronic devices based on the access controller device application of selected metering rules, and a content sharing scheme including sharing formulas for modifying the selected metering rules to control simultaneous use of the shared screen device by shared content metering based on determining a split credit content consumption rate between the multiple users, the content sharing scheme includes information for parental control content consumption metering based on user information and a sharing information to determine a parental control usage limit for display of the content on the shared screen device to the multiple users;

controlling content display on the shared screen device by performing at least one of: metering access and blocking access, by the access controller device, for displaying of the content on the shared screen device for the multiple users by enforcing the selected metering rules, rule sets and the content sharing scheme on the electronic devices and the shared screen device for the multiple users; and maintaining the content sharing scheme in a memory unit.

12. The non-transitory processor-readable medium of claim 11, the method further comprising:

selectively controlling display of inappropriate content on the shared screen device to multiple simultaneous users of the shared screen device based on the selected metering rules and the content sharing scheme;

wherein: the user information includes information relating to user profile and user activity of the multiple users;

the user information is shared between the electronic devices in the communication system; and the selected metering rules comprise a configurable set of content sharing rules for the content consumption rates for the multiple users of the shared screen device.

13. The non-transitory processor-readable medium of claim 12, the method further comprising:

determining, by the access controller device, the content access actions via the electronic devices, wherein the content access actions comprise turning on an electronic device, changing a channel for an electronic device, or starting to view video content stored in a network including the electronic devices.

14. The non-transitory processor-readable medium-of claim 13, the method further comprising:

maintaining usage accounts for the multiple users and automatically synchronizing the usage accounts across multiple electronic devices, wherein metering limits for each user are enforced across all devices within the network.

15. The non-transitory processor-readable medium of claim 14, the method further comprising:

controlling display of inappropriate content on the shared screen device based on a totality of users accessing the shared screen device and the content sharing scheme for simultaneous use by concurrent users.

16. The non-transitory processor-readable medium of claim 15, wherein:

the communication system comprises the network; and
the method further comprises:

tracking presence of multiple users via the electronic devices across the network, and applying the configurable set of content sharing rules for controlling display of content on the shared screen device based on a list of users utilizing the shared screen device and usage history for each user across all electronic devices in the network.

17. The non-transitory processor-readable medium of claim 16, the method further comprising:

controlling display of content on the shared screen devices between multiple users of varying ages and for varying maturity level access.

18. The non-transitory processor-readable medium of claim 17, the method further comprising:

providing content access limits for a user and controlling display of content for the electronic devices to enforce the limits across the electronic devices in the network based on user usage limits for the electronic devices.

19. The non-transitory processor-readable medium of claim 18, the method further comprising:

selectively controlling the shared screen device to meter display of content for a user based on the configurable set of content sharing rules that provide an incentive for content consumption based on concurrent shared access with another particular user by altering a metering formula for at least one of the user and the another particular user.

20. The non-transitory processor-readable medium of claim 19, wherein:

each electronic device provides for multiple users to be logged on or logged off the electronic device concurrently; and the method further comprises:

sharing user profiles and activity between multiple electronic devices.

21. The non-transitory processor-readable medium of claim 20, wherein the configurable set of content sharing rules comprises: rating rules based on user age, rating rules based on experts selections, rules based on family settings, or rules based on family interaction histories.

22. The non-transitory processor-readable medium of claim 21, wherein the rules based on family settings comprise: blocking, content consumption allowance, multiple users weights/offsets, family geographic weights/offsets, family demographic weights/offsets, or family social affiliation weights/offsets.

23. The non-transitory processor-readable medium of claim 22, wherein the rules based on family interaction histories comprise: multi-device multi-user login history, users or family credits usage history, users or family show rating history or users or family device usage schedule history.

24. A method comprising:

controlling, by an access controller device, display on electronic devices to control content access by multiple users based on using parental control content access actions via the electronic devices in a communication system, provided content information and provided user profile information;

transmitting, in response to receiving a login command and updating data information for a logged in list, the updated data information to the electronic devices to update state for a plurality of the electronic devices to maintain a consistent state between the electronic devices, wherein a local device login listener of the shared screen device receives login updates from an active user reporter of another shared screen device, and the local device login listener and the active user reporter maintain the consistent state between the shared screen device and the another shared screen device based on replication of all state changes;

performing content stream control for the electronic devices for controlling, by the access controller device, the electronic devices to control display of content for the multiple users via the electronic devices based on applying selected metering rules and a content sharing scheme including sharing formulas for modifying the selected metering rules to control simultaneous use of the shared screen device by shared content metering based on determining a split credit content consumption rate between the multiple users, the content sharing scheme includes information for parental control content access rules based on user information and sharing information to determine a parental control usage limit for simultaneous content usage for the multiple users;

controlling, by the access controller device, content display on the shared screen device by performing at least one of metering access and blocking access of displayed content for the multiple users by enforcing the selected metering rules, rule sets and the content sharing scheme on the electronic devices and the shared screen device for the multiple users and maintaining the selected metering rules and the content sharing scheme in a memory unit.

25. The method of claim 24, wherein:
the user information includes information relating to user profile and user activity of the multiple users;
the user information is shared between the electronic devices in the communication system; and
the content sharing scheme comprises content access rules for controlling access to content by each user via the shared screen device.

26. The method of claim 25, wherein the content sharing scheme comprises content consumption rules for controlling amount of access to content by each user via an electronic device in the communication system by altering a metering formula for at least one user of the multiple users.

27. The method of claim 26, wherein the content sharing scheme comprises configuring the selected metering rules that comprise content access rules, and the content consumption rules for the multiple users based on concurrent shared access to content via the shared screen device.

28. The method of claim 27, wherein the content access rules comprise: rating rules based on user age, rating rules based on experts selections, rules based on family settings, or rules based on family interaction histories.

29. The method of claim 24, wherein:
selectively controlling the electronic devices to control display of content comprises controlling the display on the electronic devices to meter content and to block inappropriate content to multiple simultaneous users based on the content sharing scheme.

30. The method of claim 29, further comprising maintaining usage accounts for the multiple users and automatically synchronizing the usage accounts across multiple electronic devices.

31. The method of claim 29, wherein:
controlling content display on the shared screen device blocks inappropriate content based on a totality of users accessing content and the content sharing scheme for simultaneous use of the shared screen device.

32. The method of claim 29, wherein:
the communication system comprises a network; and
the method further comprising tracking presence of multiple users via the electronic devices across the network, and applying the selected metering rules that comprise a configurable set of content sharing rules for controlling display of the shared screen device to meter and block content on the shared screen device based on a list of users utilizing the shared screen device and usage history for each user across all electronic devices in the network.

33. The method of claim 29, further comprising:
controlling display of the shared screen device to meter usage between multiple users of varying ages having varying maturity level access.

34. The method of claim 29, further comprising:
controlling display on the electronic devices to provide content access limits for a user and enforcing the limits across the electronic devices in the network.

35. The method of claim 29, further comprising:
selectively controlling display on the shared screen device to meter content access for a user based on the selected metering rules that comprise a configurable set of content sharing rules that provide an incentive for content consumption based on concurrent shared access with another particular user.

36. The method of claim 29, further comprising:
each of the-electronic devices allowing multiple users to be logged on or logged off the electronic device concurrently; and
sharing user profiles and activity between the electronic devices.

37. The method of claim 24, further comprising:
controlling each of the electronic devices to control access by accepting concurrent multiple user access actions to each of the electronic devices;
maintaining user access action status;
sharing user access action status information among multiple electronic devices in the communication system; and
providing the user access action status information to users of the multiple electronic devices.

38. The method of claim 37, further comprising:
maintaining profile data for each user, the profile data including at least one of: user identification information and personal preferences, shared profile information, and private profile information; and
sharing information from user profile data of multiple users among multiple electronic devices in the communication system, wherein each of the multiple users is concurrently logged into at least one electronic device in the communication system.

39. The method of claim 38, further comprising:
providing each logged in user of an electronic device information about the current state and location of other logged in users of electronic devices in the communication system.

40. The method of claim 39, wherein:
at least one of the electronic devices comprises a communal electronic device configured for concurrent use by multiple users; and
at least one of the electronic devices comprises a personal electronic device configured for use by an individual user.

41. A method, comprising:
at a control device having one or more processors and memory storing instructions for execution by the one or more processors, wherein the control device is one of one or more devices in a communication system:
detecting a request for simultaneous access to content via a first device of the one or more devices by a first user and a second user who are logged into the first device, wherein the first and second users are assigned respective credit allowances corresponding to respective limits for accessing content via the one or more devices, wherein the one or more devices maintain a consistent state between the one or more devices, the first device is a first shared screen device, a local device login listener of the first device receives login updates from an active user reporter of a second shared screen device, and the local device login listener and the active user reporter maintain the consistent state between the first shared screen device and the second shared screen device based on replication of all state changes;

for the first and second users, identifying respective metering rules specifying respective rates at which credit allowances are consumed while accessing content via the one or more devices;

identifying a sharing scheme that includes one or more sharing formulas for modifying one or more of the respective metering rules for the first and second users, wherein the one or more modified metering rules are applied during simultaneous access to content by the first and second users;

based on the one or more sharing formulas of the identified sharing scheme, modifying one or more of the respective metering rules for the first and second users to obtain the one or more modified metering rules by shared content metering based on determining a split credit content consumption rate between the first and second users; and providing the requested access to content via the first device in accordance with the one or more modified metering rules.

* * * * *